(12) United States Patent
Kondo et al.

(10) Patent No.: US 12,524,643 B2
(45) Date of Patent: Jan. 13, 2026

(54) SEMICONDUCTOR STORAGE DEVICE

(71) Applicant: Kioxia Corporation, Tokyo (JP)

(72) Inventors: Atsushi Kondo, Yokohama (JP); Ryo Yonezawa, Kawasaki (JP)

(73) Assignee: Kioxia Corporation, Tokyo (JP)

( * ) Notice: Subject to any disclaimer, the term of this patent is extended or adjusted under 35 U.S.C. 154(b) by 418 days.

(21) Appl. No.: 17/822,542

(22) Filed: Aug. 26, 2022

(65) Prior Publication Data

US 2022/0414414 A1   Dec. 29, 2022

Related U.S. Application Data

(63) Continuation of application No. PCT/JP2020/042848, filed on Nov. 17, 2020.

(30) Foreign Application Priority Data

Feb. 28, 2020 (JP) ................................. 2020-033519
Jul. 27, 2020 (JP) ................................. 2020-126444

(51) Int. Cl.
*H05K 5/00* (2025.01)
*G06F 3/06* (2006.01)
*G06K 19/077* (2006.01)
*G11C 5/06* (2006.01)
*H05K 1/18* (2006.01)

(52) U.S. Cl.
CPC ..... *G06K 19/07732* (2013.01); *G06F 3/0679* (2013.01); *G11C 5/06* (2013.01); *H05K 1/181* (2013.01); *H05K 2201/10159* (2013.01)

(58) Field of Classification Search
None
See application file for complete search history.

(56) References Cited

U.S. PATENT DOCUMENTS

| 10,714,853 | B2 |   | 7/2020 | Saito et al. |
| 11,683,887 | B2 | * | 6/2023 | Vasa ................. H05K 1/0219 361/748 |
| 2011/0130029 | A1 |   | 6/2011 | Yoshida et al. |

(Continued)

FOREIGN PATENT DOCUMENTS

JP       2016-167167 A    9/2016
JP   WO 2018/186456 A1   10/2018

(Continued)

*Primary Examiner* — Imani N Hayman
*Assistant Examiner* — Rashen E Morrison
(74) *Attorney, Agent, or Firm* — Oblon, McClelland, Maier & Neustadt, L.L.P.

(57) ABSTRACT

According to one embodiment, a semiconductor storage device includes a plurality of terminals. The plurality of terminals form at least a first row and a second row. The first row includes a plurality of terminals arranged in a first direction at intervals from each other at locations closer to a first end edge than to a second end edge. The second row includes a plurality of terminals arranged in the first direction at intervals from each other at locations closer to the second end edge than to the first end edge. An area between the first row and the second row on a first surface includes a contact area that is in contact with a heat-conducting member, which is disposed on a printed circuit board in a host device that is electrically connected to the semiconductor storage device.

19 Claims, 24 Drawing Sheets

(56) References Cited

U.S. PATENT DOCUMENTS

| | | | |
|---|---|---|---|
| 2015/0243371 A1 | 8/2015 | Han et al. | |
| 2016/0266794 A1 | 9/2016 | Ishibashi | |
| 2019/0393633 A1* | 12/2019 | Saito | H05K 5/0247 |
| 2020/0034321 A1 | 1/2020 | Ono | |
| 2020/0090020 A1 | 3/2020 | Fujimoto et al. | |
| 2021/0055866 A1 | 2/2021 | Fujimoto et al. | |
| 2022/0414414 A1* | 12/2022 | Kondo | G11C 5/06 |

FOREIGN PATENT DOCUMENTS

| | | | |
|---|---|---|---|
| JP | 2019-192204 A | 10/2019 | |
| JP | 2020-3875 A | 1/2020 | |
| JP | 2020-522787 A | 7/2020 | |

\* cited by examiner

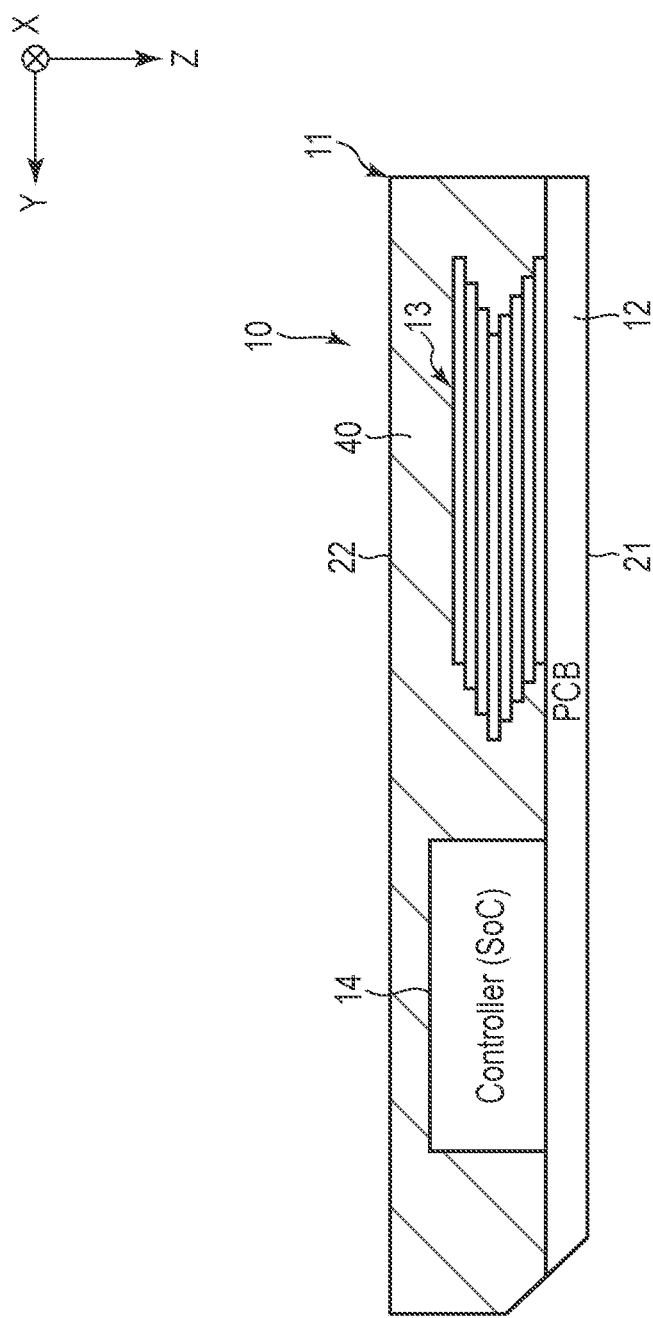
F I G. 2

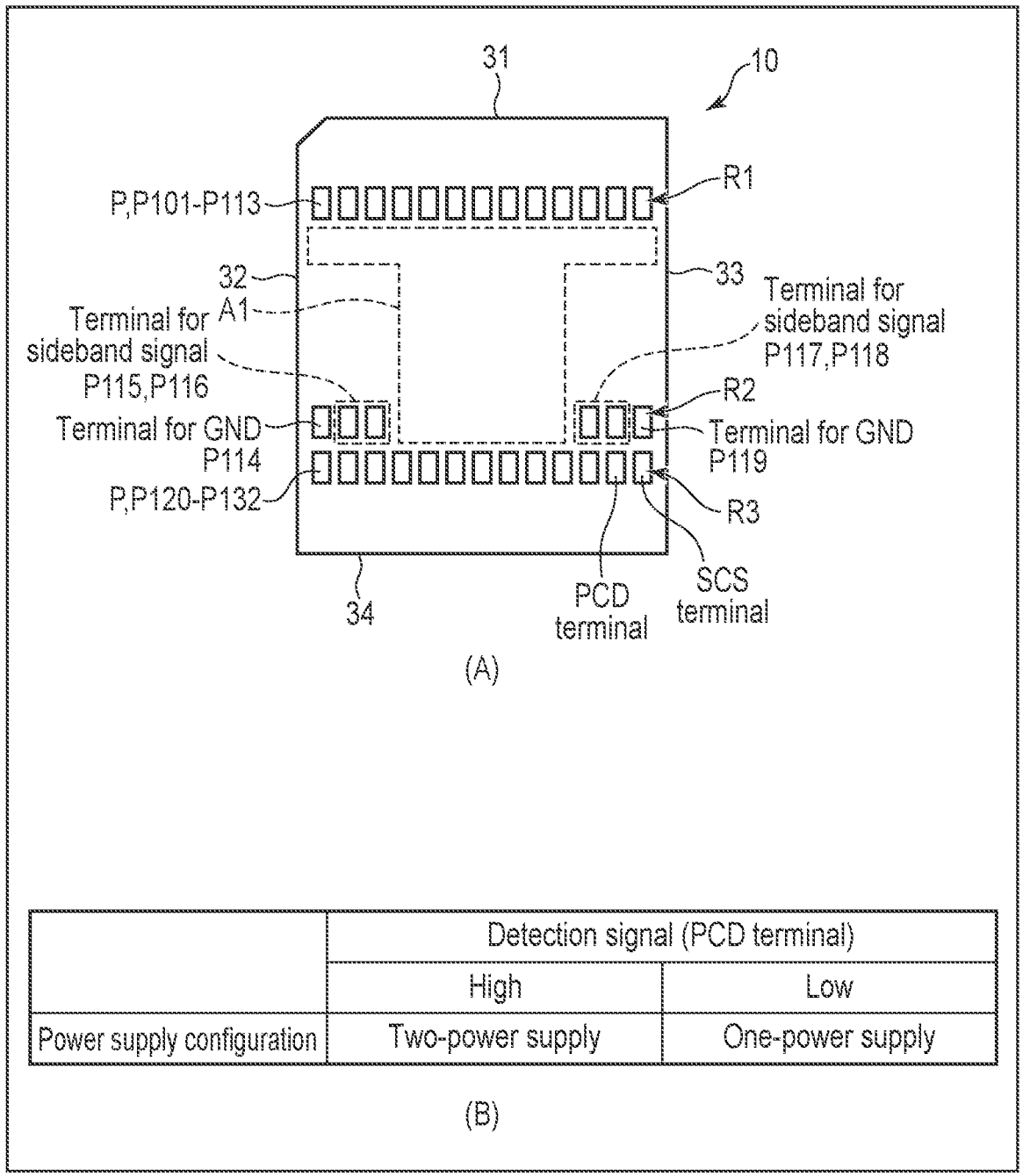
F I G. 9

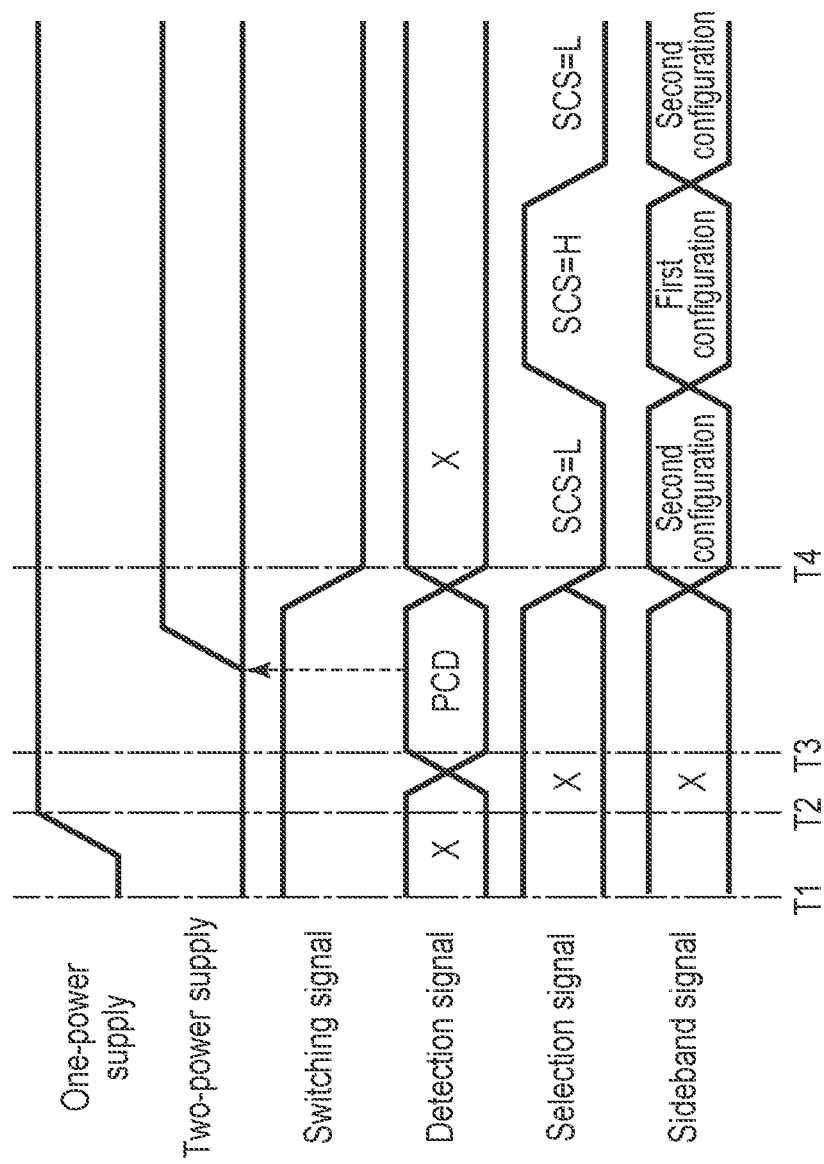
F I G. 12

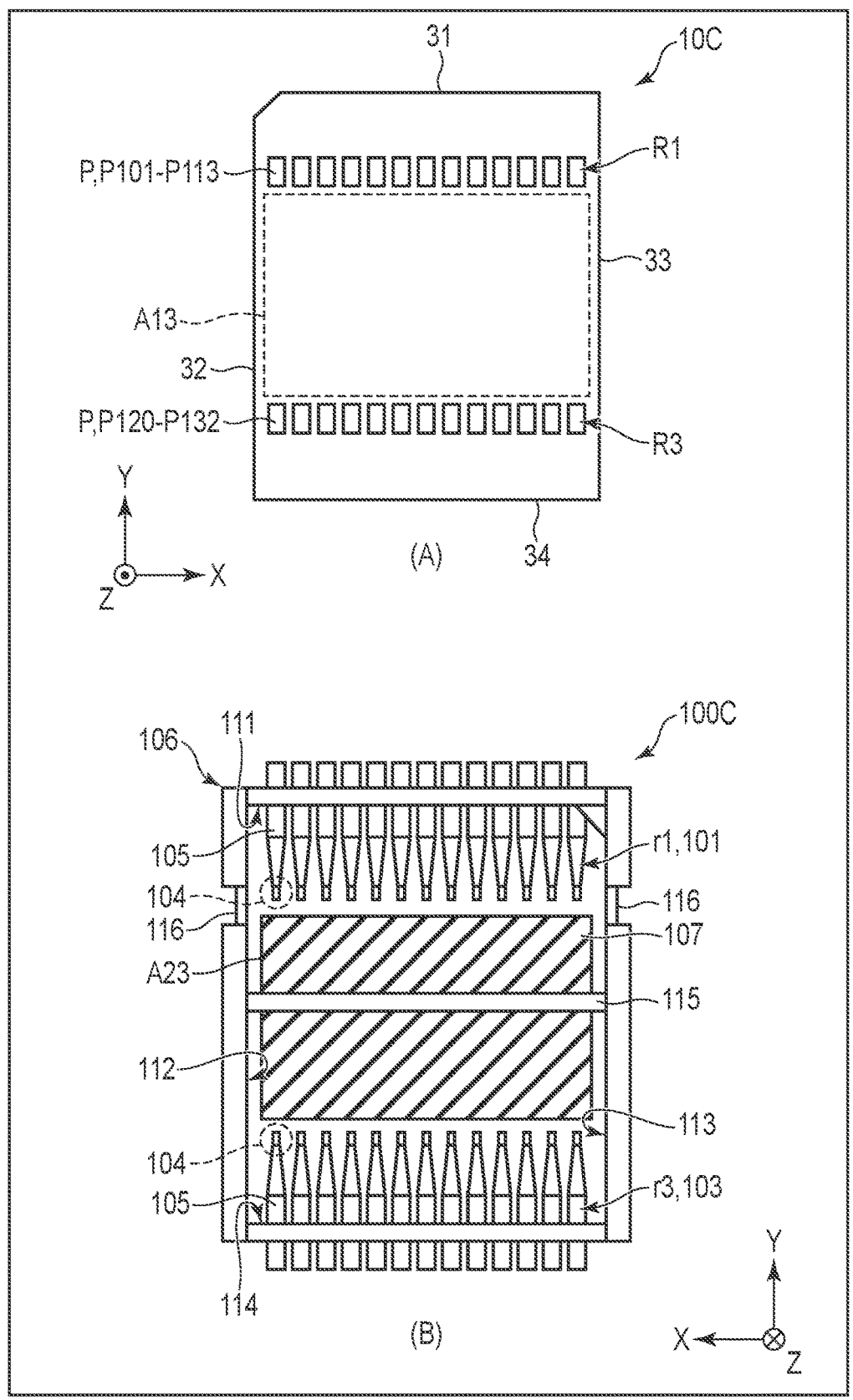
F I G. 15

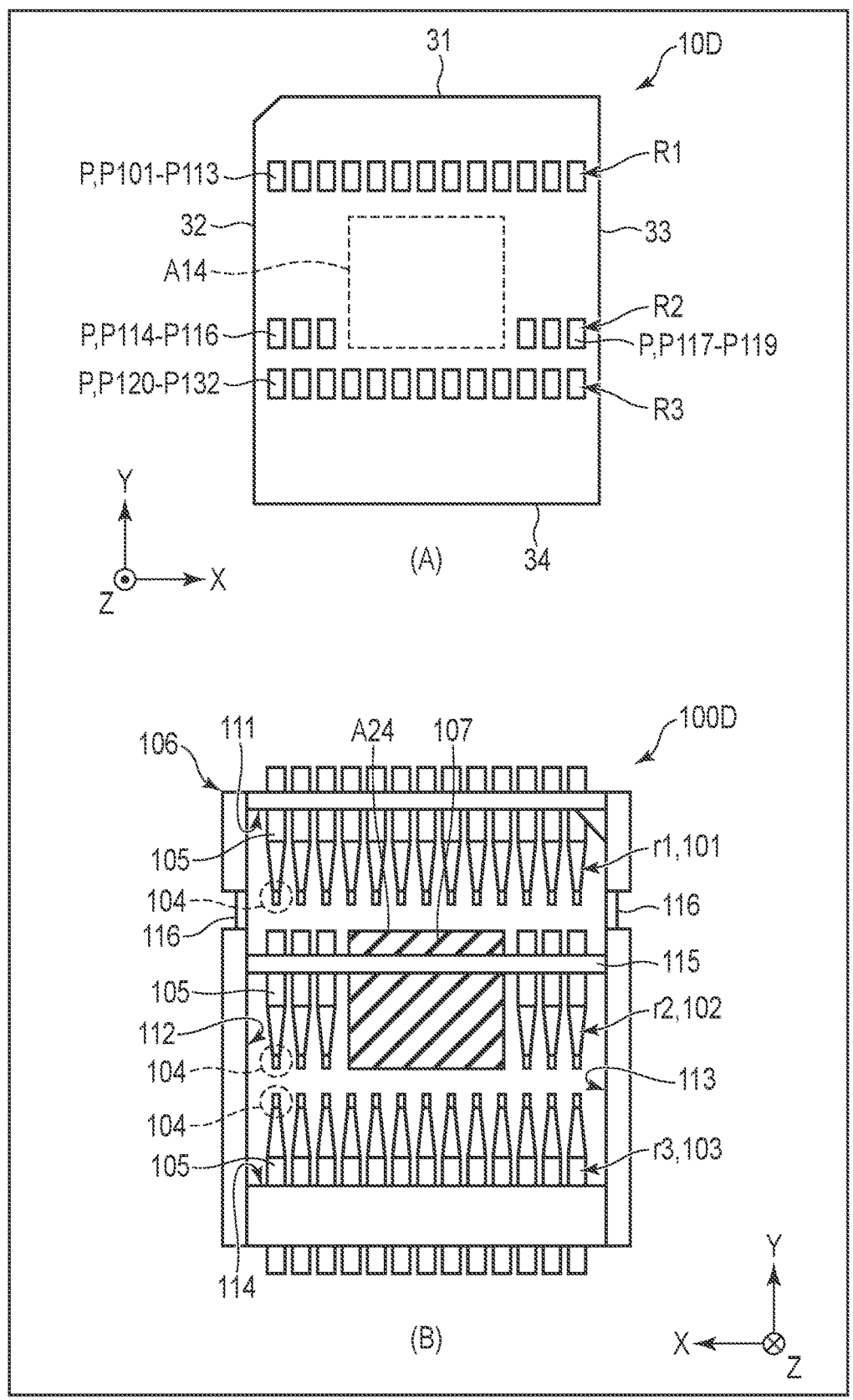
F I G. 16

| Terminal No. | P101 | P102 | P103 | P104 | P105 | P106 | P107 | P108 | P109 | P110 | P111 | P112 | P113 |
|---|---|---|---|---|---|---|---|---|---|---|---|---|---|
| Signal | GND | Rx0+ | Rx0- | GND | Rx1+ | Rx1- | GND | Tx0+ | Tx0- | GND | Tx1+ | Tx1- | GND |

R1

F I G. 17

| Terminal No. | P101 | P102 | P103 | P104 | P105 | P106 | P107 | P108 | P109 | P110 | P111 | P112 | P113 | P114 |
|---|---|---|---|---|---|---|---|---|---|---|---|---|---|---|
| Signal | GND | Rx0+ | Rx0- | GND | Rx1+ | Rx1- | GND | GND | Tx0+ | Tx0- | GND | Tx1+ | Tx1- | GND |

R1

F I G. 19

| R2 | Terminal No. | P114 | P115 | P116 | P117 | P118 | P119 |
|---|---|---|---|---|---|---|---|
| | Signal | GND | GND | RSVD | RSVD | GND | GND |

| R3 | Terminal No. | P120 | P121 | P122 | P123 | P124 | P125 | P126 | P127 | P128 | P129 | P130 | P131 | P132 |
|---|---|---|---|---|---|---|---|---|---|---|---|---|---|---|
| | Signal | GND | REF CLK+ | REF CLK- | GND | GND | PE RST# | 1.2V | 1.2V | 1.2V | CLK REQ# | 2.5V | 2.5V | 2.5V |

: For return current
: For noise guard

F I G. 20

| Terminal No. | P114 | P115 | P116 | | | | | P117 | P118 | P119 |
|---|---|---|---|---|---|---|---|---|---|---|
| Signal | GND | RSVD | RSVD | | | | | RSVD | RSVD | GND |

R2

| Terminal No. | P120 | P121 | P122 | P123 | P124 | P125 | P126 | P127 | P128 | P129 | P130 | P131 | P132 |
|---|---|---|---|---|---|---|---|---|---|---|---|---|---|
| Signal | GND | REF CLK+ | REF CLK- | GND | 1.2V | 1.2V | PE RST# | 1.2V | 2.5V | CLK REQ# | 2.5V | 2.5V | NC |

R3

▨ : For return current
▨ : For noise guard

F I G. 21

SEMICONDUCTOR STORAGE DEVICE

CROSS-REFERENCE TO RELATED APPLICATIONS

This application is a Continuation Application of PCT Application No. PCT/JP2020/042848, filed Nov. 17, 2020, and based upon and claiming the benefit of priority from Japanese Patent Application No. 2020-033519, filed Feb. 28, 2020; and No. 2020-126444, filed Jul. 27, 2020, the entire contents of all of which are incorporated herein by reference.

FIELD

Embodiments described herein relate generally to a semiconductor storage device.

BACKGROUND

In recent years, the storage capacity of nonvolatile memories has been increasing with the technological improvement of nonvolatile memories such as NAND flash memories. This has led to the development of semiconductor storage devices such as removable memory devices.

In the semiconductor storage devices such as the removable memory devices, there is a need to realize a mechanism to improve heat dissipation efficiency.

BRIEF DESCRIPTION OF THE DRAWINGS

FIG. 2 shows a configuration example of the memory device according to the same embodiment.

FIG. 9 illustrates a case in which a terminal of the memory device is used as a PCD terminal according to the same embodiment.

FIG. 12 shows a timing chart of an operation example in a case where one of the terminals of the memory device according to the same embodiment is used both as the SCS terminal and the PCD terminal.

FIG. 15 is a plan view showing an external shape of a memory device, an external shape of a connector to which the memory device is attached, and an arrangement example of an area to which a TIM is attached according to a third modified example.

FIG. 16 is a plan view showing an external shape of a memory device, an external shape of a connector to which the memory device is attached, and an arrangement example of an area to which a TIM is attached according to a fourth modified example.

FIG. 17 shows an example of a pin assignment of a memory device according to a second embodiment.

FIG. 19 shows another example of the pin assignment of the memory device according to the same embodiment.

FIG. 20 shows an example of the pin assignment of the memory device according to the same embodiment.

FIG. 21 shows a pin assignment of a comparative example with respect to a configuration of FIG. 20.

DETAILED DESCRIPTION

In general, according to one embodiment, a semiconductor storage device comprises a main body, a memory, a controller, and a plurality of terminals. The main body includes a first surface, a second surface located on the opposite side of the first surface, a first end edge extending in a first direction, a second end edge located on the opposite side of the first end edge and extending in the first direction, a first side edge extending in a second direction intersecting the first direction, and a second side edge located on the opposite side of the first side edge and extending in the second direction. The memory is provided inside the main body. The controller is provided inside the main body and controls the memory. The plurality of terminals include a plurality of signal terminals used for signal transmission and are exposed on the first surface. The plurality of terminals form at least a first row and a second row. The first row includes a plurality of terminals arranged in the first direction at intervals from each other at locations closer to the first end edge than to the second end edge. The second row includes a plurality of terminals arranged in the first direction at intervals from each other at locations closer to the second end edge than to the first end edge. An area between the first row and the second row on the first surface includes a contact area that is in contact with a heat-conducting member, which is disposed on a printed circuit board in a host device that is electrically connected to the semiconductor storage device.

Hereinafter, embodiments will be described with reference to the drawings.

A semiconductor storage device includes a nonvolatile memory and a controller that controls the nonvolatile memory. The semiconductor storage device is a storage device configured to write data to the nonvolatile memory and read data from the nonvolatile memory. The semiconductor storage device may be realized, for example, as a solid state drive (SSD). In this case, the SSD is used as a storage for various information processing devices that function as host devices, such as personal computers, mobile devices, video recorders, and in-vehicle equipment.

First Embodiment

A semiconductor storage device according to a first embodiment has a card shape and can function as a removable SSD that can be attached to a connector in a host device. The connector to which the semiconductor storage device of the present embodiment is attached may be a push-push type connector, a push-pull type connector, or a hinge-type connector. In the present embodiment, a case in which the connector to which the semiconductor storage device is attached is a hinge-type connector is assumed.

A removable feature of the semiconductor storage device allows for capacity upgrades and easy maintenances. In the following, the semiconductor storage device is referred to as a memory device (or a removable memory device).

Figure 1:
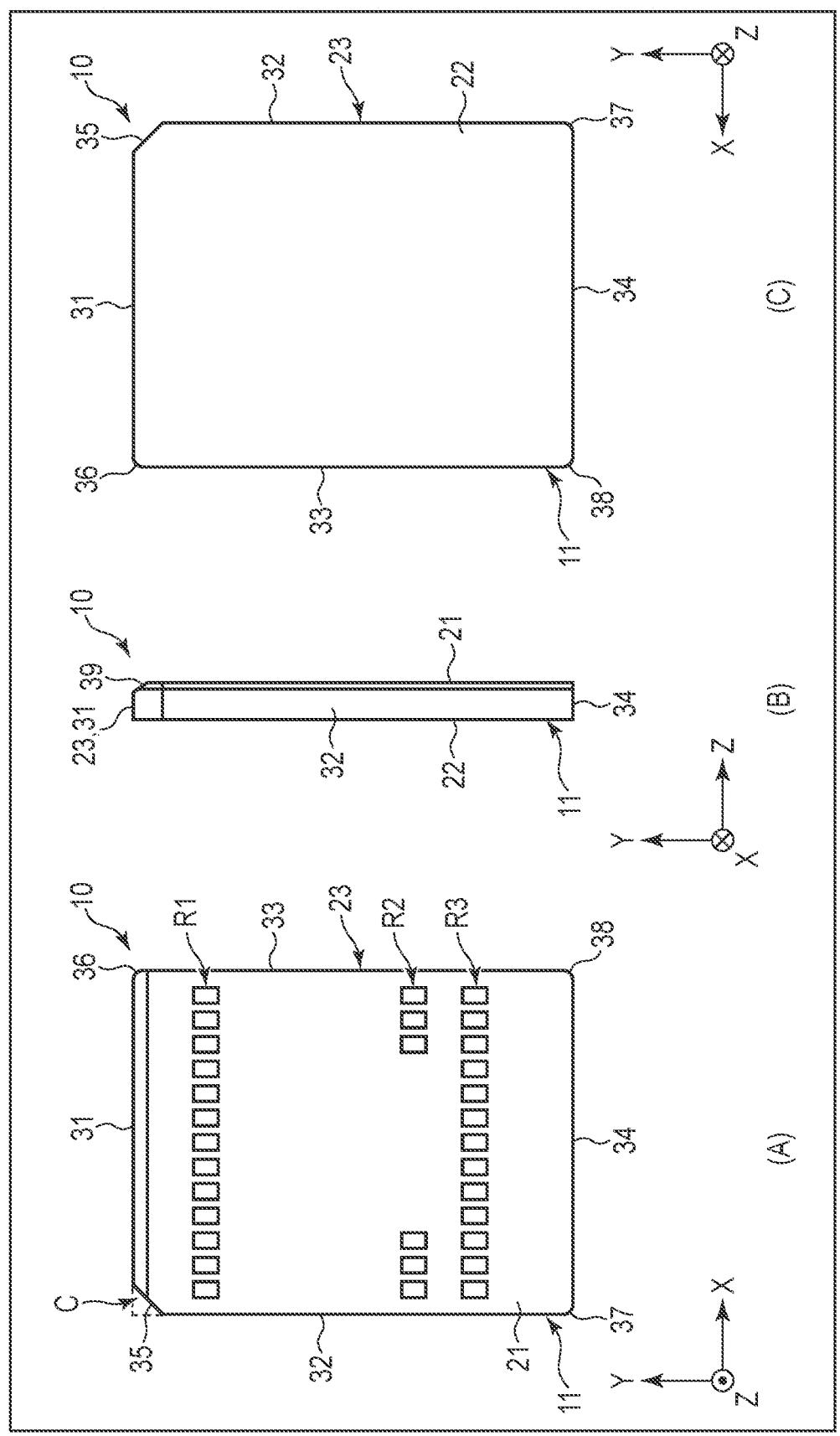
FIG. 1 is an exemplary diagram showing an external shape of a memory device according to a first embodiment.

FIG. 1 is an exemplary diagram showing an external shape of a memory device 10 according to the first embodiment. (A) of FIG. 1 is a plan view showing one surface of the memory device 10. (B) of FIG. 1 is a side view showing a side surface of the memory device 10. (C) of FIG. 1 is a plan view showing one surface of the memory device 10, which is another surface located on an opposite side of the one surface shown in (A) of FIG. 1.

As shown in (A) of FIG. 1 to (C) of FIG. 1, X-, Y-, and Z-axes are defined herein. The X-, Y-, and Z-axes are orthogonal to each other. The X-axis is along a width of the memory device 10. The Y-axis is along a length (height) of the memory device 10. The Z-axis is along a thickness of the memory device 10. In the present specification, viewing the memory device 10 and the connector to which the memory device 10 is mounted from a negative direction of the Z-axis is referred to as planar view.

The memory device 10 is a semiconductor storage device configured to operate on an externally supplied power supply voltage.

As shown in FIG. 1, the memory device 10 comprises a main body (housing) 11 having the form of a thin plate-shaped semiconductor package. The memory device 10 and the main body 11 are formed in a substantially rectangular plate shape extending in the Y-axis direction, for example. The Y-axis direction is a longitudinal direction of the memory device 10 and the main body 11.

As shown in FIG. 1, the main body 11 is plate-shaped and has a first surface 21, a second surface 22, and an outer edge 23. The first surface 21 and the second surface 22 are formed in a substantially square (rectangular) shape extending in the Y-axis direction. In other words, the Y-axis direction is also a longitudinal direction of the first surface 21 and the second surface 22.

The first surface 21 is a substantially flat surface facing in a positive direction of the Z-axis. The second surface 22 is located on an opposite side of the first surface 21 and is a substantially flat surface facing in a negative direction of the Z-axis.

The outer edge 23 is provided between the first surface 21 and the second surface 22, and connected to the edge of the first surface 21 and the edge of the second surface 22. As shown in FIG. 1, the outer edge 23 has a first edge 31, a second edge 32, a third edge 33, a fourth edge 34, a first corner portion 35, a second corner portion 36, a third corner portion 37, and a fourth corner portion 38.

The first edge 31 extends in the X-axis direction and faces in a positive direction of the Y-axis. The X-axis direction is a lateral direction of the main body 11, the first surface 21, and the second surface 22, and includes a positive direction of the X-axis and a negative direction of the X-axis.

The second edge 32 extends in the Y-axis direction and faces in the negative direction of the X-axis. The third edge 33 is located on the opposite side of the second edge 32, extends in the Y-axis direction, and faces in the positive direction of the X-axis. The fourth edge 34 is located on the opposite side of the first edge 31, extends in the X-axis direction, and faces in a negative direction of the Y-axis.

The length of each of the second edge 32 and the third edge 33 is longer than the length of each of the first edge 31 and the fourth edge 34. The first edge 31 and the fourth edge 34 form short sides of the substantially rectangular memory device 10, and the second edge 32 and the third edge 33 form long sides (side edges) of the substantially rectangular memory device 10.

The first corner portion 35 is a corner portion between the first edge 31 and the second edge 32, and connects an end of the first edge 31 in the negative direction of the X-axis and an end of the second edge 32 in the positive direction of the Y-axis.

The first corner portion 35 extends linearly between the end of the first edge 31 in the negative direction of the X-axis and the end of the second edge 32 in the positive direction of the Y-axis. The first corner portion 35 is provided by setting the corner between the first edge 31 and the second edge 32 to a so-called C1.1 corner chamfer (also referred to as C chamfer). According to another expression, the first corner portion 35 is a corner chamfered portion C formed between the first edge 31 and the second edge 32.

The second corner portion 36 is a corner portion between the first edge 31 and the third edge 33, and connects an end of the first edge 31 in the positive direction of the X-axis and an end of the third edge 33 in the positive direction of the Y-axis. The second corner portion 36 extends in an arc shape between the end of the first edge 31 in the positive direction of the X-axis and the end of the third edge 33 in the positive direction of the Y-axis. The second corner portion 36 is provided by setting the corner between the first edge 31 and the third edge 33 to a so-called round chamfer of R0.2 (also referred to as R chamfer). As described above, the shape of the first corner portion 35 and the shape of the second corner portion 36 are different from each other.

The third corner portion 37 connects an end of the second edge 32 in the negative direction of the Y-axis and an end of the fourth edge 34 in the negative direction of the X-axis. The fourth corner portion 38 connects an end of the third edge 33 in the negative direction of the Y-axis and an end of the fourth edge 34 in the positive direction of the X-axis. The third corner portion 37 and the fourth corner portion 38 each extend in an arc shape in the same manner as the second corner portion 36.

The main body 11, the first surface 21, and the second surface 22 have a length set to approximately 18±0.10 mm in the Y-axis direction and a length set to approximately 14±0.10 mm in the X-axis direction. That is, a distance between the first edge 31 and the fourth edge 34 in the Y-axis direction is set to approximately 18±0.1 mm, and a distance between the second edge 32 and the third edge 33 in the X-axis direction is set to approximately 14±0.10 mm. Note that the lengths of the main body 11, the first surface 21, and the second surface 22 in the X-axis direction and the Y-axis direction are not limited to this example.

The thickness of the main body 11 and the outer edge 23 in the Z-axis direction is set to approximately 1.4 mm±0.10 mm. That is, a distance between the first surface 21 and the second surface 22 in the Z-axis direction is set to approximately 1.4 mm±0.10 mm. Note that a length of the outer edge 23 in the Z-axis direction is not limited to this example since, in some cases, an inclined portion 39 may be formed or chamfered. In order to ensure fitting with the connector, the Z-axis direction must be defined by a planar tolerance, and the thickness must be within the tolerance over the entire surface.

As shown in (B) of FIG. 1, the main body 11 further includes the inclined portion 39. The inclined portion 39 is a corner portion between the first surface 21 and the first edge 31, and extends linearly between an end of the first surface 21 in the positive direction of the Y-axis and an end of the first edge 31 in the positive direction of the Z-axis.

As shown in (A) of FIG. 1, the first surface 21 of the memory device 10 may have a plurality of terminals arranged in row R1, row R2, and row R3. In row R1, for example, signal terminals for two lanes for a high-speed serial interface such as PCI Express (registered trademark) (PCIe) are arranged. The signal terminal corresponding to one lane includes two terminals of a receiver differential signal pair and two terminals of a transmitter differential signal pair. The two terminals of a receiver differential signal pair may be referred to as a pair of receiver differential data signal terminals. The two terminals of a transmitter differential signal pair may be referred to as a pair of transmitter differential data signal terminals. Furthermore, two differential terminals are surrounded by a ground terminal. Although not shown, a PCIe lane can be added between row R1 and row R2.

Signal terminals for arbitrary optional signals that differ from product to product can be arranged in row R2. Examples of the signal terminals for optional signals include a sideband signal (SMBus signal, signal terminals for WAKE #signal and PRSNT #signal) conforming to a PCIe standard, a ground terminal, and the like. In row R3, control signals common to products and terminals for power supply are arranged. Examples of the sideband signal conforming to the PCIe standard include a CLKREF signal pair, a CLKREF #signal, a PERST #signal, and the like. In row R3, a plurality of power supply terminals to which a power supply voltage from the host device is supplied and ground terminals are arranged.

Note that row R1 may be referred to as a first row. Row R3 may be referred to as a second row. Row R2 may also be referred to as a third row.

FIG. 2 shows a configuration example of the memory device 10.

As shown in FIG. 2, a printed circuit board 12, a NAND flash memory 13, and a controller 14 are provided inside the main body 11 of the memory device 10. The printed circuit board 12, the NAND flash memory 13, and the controller 14 may be accommodated in a box-shaped main body 11 or may be embedded in the main body 11. The NAND flash memory 13 and the controller 14 are mounted on the surface of the printed circuit board 12.

Note that the printed circuit board 12 may configure a part of the main body 11 in a manner that a back surface of the printed circuit board 12 is exposed. In this case, the back surface of the printed circuit board 12 can function as the first surface 21.

The NAND flash memory 13 may include a plurality of stacked NAND flash memory chips. Normally, these plurality of NAND flash memory chips operate interleaved. The controller 14 is an LSI. The controller 14 controls the NAND flash memory 13 and the entire memory device 10 including the NAND flash memory 13. For example, the controller 14 can perform read/write control to the NAND flash memory 13 and communication control with the outside. Furthermore, the memory device 10 has a PCIe interface as a system interface, and the memory device 10 performs communication control with a protocol conforming to the PCIe standard.

The memory device 10 is realized as a package having a card shape (memory package), and the NAND flash memory 13 and the controller 14 are covered and sealed by a mold resin 40 molded to form a body (main body 11) of the memory device 10.

Figure 3:
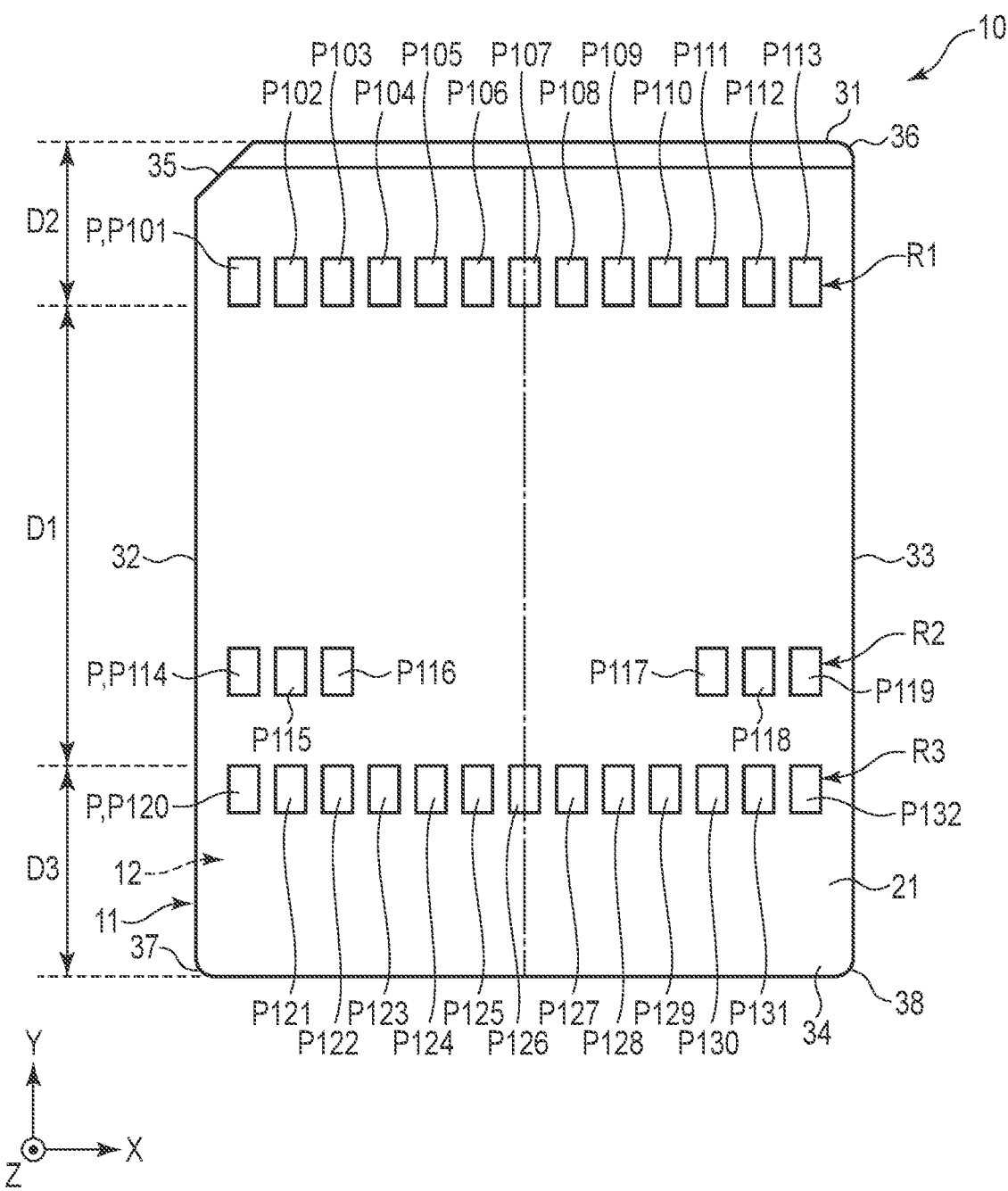
FIG. 3 is a plan view showing the external shape of the memory device and an arrangement example of a plurality of terminals according to the same embodiment.

FIG. 3 is a plan view showing an external shape of the memory device 10 and an arrangement example of a plurality of terminals P.

As shown in FIG. 3, the memory device 10 has a plurality of terminals P. The terminals P may be referred to as pins or pads. Although FIG. 3 shows an example of the memory device 10 including 32 terminals P, the number of terminals P is only an example and is not limited to this example. In other words, the number of terminals P may be less than 32 or more than 32. The plurality of terminals P are provided, for example, on the back surface of the printed circuit board 12. The plurality of terminals P are configured on the printed circuit board 12 and exposed on the first surface 21. In the present embodiment, no terminals P are provided on the second surface 22, which can be used, for example, as a printing surface.

The plurality of terminals P are arranged in three rows, and form row R1, row R2, and row R3. A group of terminals belonging to row R1 is used as a signal terminal for transmitting a differential signal pair for two lanes conforming to the PCIe standard. In a group of terminals belonging to row R2, a signal terminal for arbitrary optional signals different for each product can be arranged. Since this signal terminal is not an essential signal terminal for the memory device 10 (in other words, it is an optional signal terminal for the memory device 10), the number of terminals belonging to row R2 can be less than the number of terminals belonging to other rows. In a group of terminals belonging to row R3, a control signal common to each product and a terminal for power supply are arranged. This terminal is mainly used as a signal terminal for a differential clock signal, a signal terminal for a common PCIe sideband signal, a power supply terminal, and other signal terminals.

As shown in FIG. 3, row R1 includes 13 terminals P101 to P113 arranged at intervals from each other in the X-axis direction at locations closer to the first edge 31 than to the fourth edge 34. The terminals P101 to P113 are arranged in the vicinity of the first edge 31 in the X-axis direction along the first edge 31.

Row R2 includes six terminals P114 to P119 arranged in the X-axis direction at intervals from each other at locations closer to the fourth edge 34 than to the first edge 31. The terminals P114 to P116 are arranged in the X-axis direction along the fourth edge 34 at locations closer to the second edge 32 than to the third edge 33. The terminals P117 to P119 are arranged in the X-axis direction along the fourth edge 34 at locations closer to the third edge 33 than to the second edge 32. According to another expression, the terminals P114 to P116 are arranged between the center line (indicated by an alternate long and short dash line) of the memory device 10 and the main body 11 in the X-axis direction and the second edge 32, and the terminals P117 to 119 are arranged between the center line of the memory device 10 and the main body 11 in the X-axis direction and the third edge 33. An interval between the terminal P116 and the terminal P117 belonging to row R2 is wider than intervals between other terminals belonging to row R2 and adjacent to each other in the X-axis direction (specifically, an interval between the terminal P114 and the terminal P115, an interval between the terminal P115 and the terminal P116, an interval between the terminal P117 and the terminal P118, and an interval between the terminal P118 and the terminal P119).

Row R3 includes 13 terminals P120 to P132 arranged in the X-axis direction at intervals from each other at locations closer to the fourth edge 34 than to the first edge 31. The terminals P120 to P132 belonging to row R3 are arranged at locations closer to the fourth edge 34 than the terminals P114 to P119 belonging to row R2.

A distance between adjacent terminals P in the X-axis direction is determined, for example, according to the number of terminals P in a case where a length between the second edge 32 and the third edge 33 is constant. Furthermore, the maximum number of terminals P arranged in the X-axis direction is determined by a width of the adjacent terminals P in the X-axis direction and a minimum distance between the adjacent terminals P. A pad width and a distance between adjacent pads that ensure contact are determined in consideration of a deviation of a contact portion with a connector contact. Distances between the plurality of terminals P in the X-axis direction may be equal or different. In the present embodiment, the number of terminals P belonging to row R1 and row R3 is the same, and the number of terminals P belonging to row R2 is smaller than that of the other rows. Therefore, terminal intervals of row R2 may be different from those of row R1 and row R3.

As shown in FIG. 3, a distance D1 between row R1 and row R3 in the Y-axis direction is longer than a distance D2 between row R1 and the first edge 31 in the Y-axis direction and a distance D3 between row R3 and the fourth edge 34 in the Y-axis direction.

In the example of FIG. 3, the lengths of the terminals P of each of row R1, row R2, and row R3 in the Y-axis direction are set to be the same. That is, the terminals P of each of row R1, row R2, and row R3 are arranged in a manner that the ends of the terminals P in the negative direction of the Y-axis and the positive direction of the Y-axis are both aligned.

Figure 4:
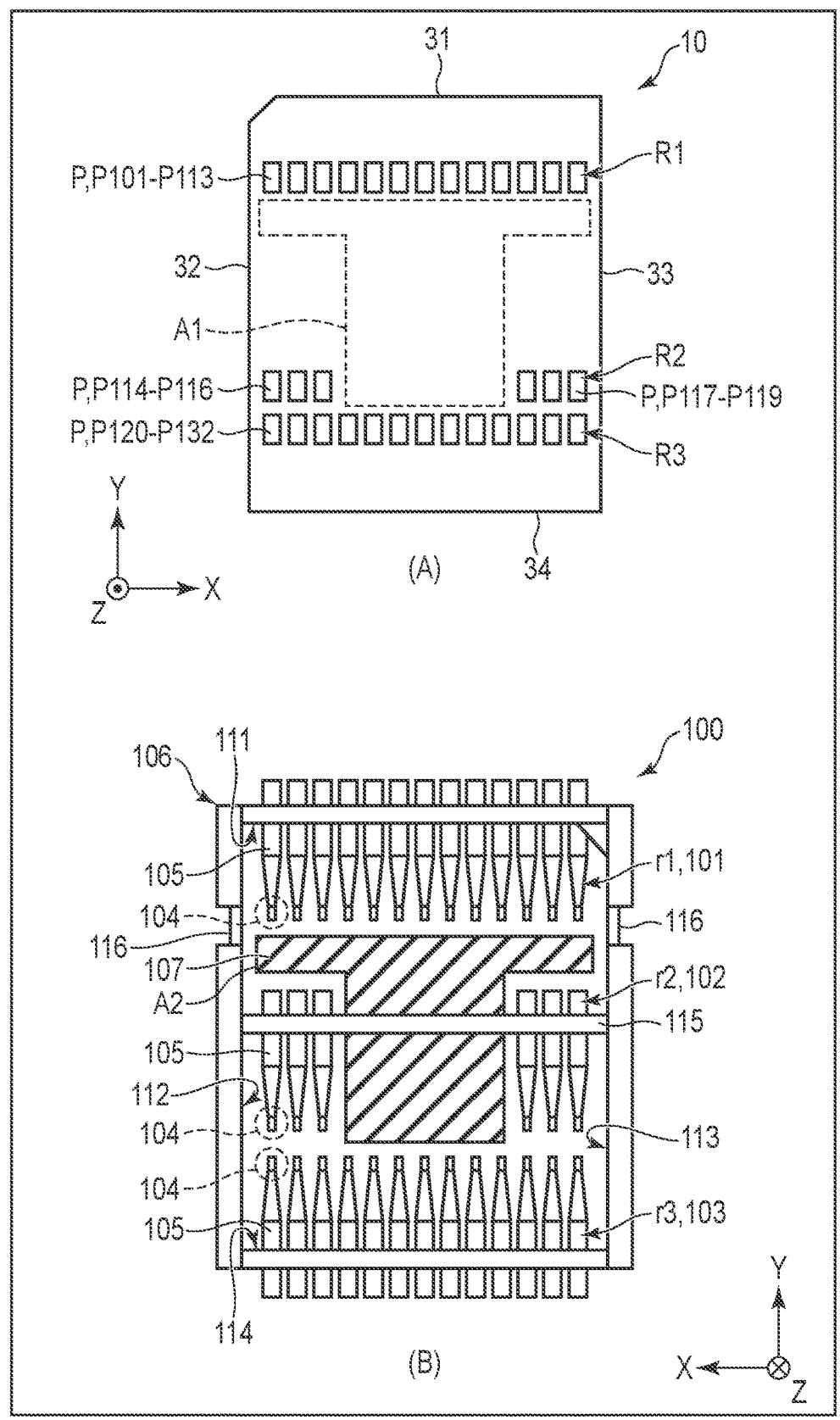
FIG. 4 is a plan view showing the external shape of the memory device, an external shape of a connector to which the memory device is attached, and an arrangement example of an area to which a TIM is attached according to the same embodiment.
Figure 5:
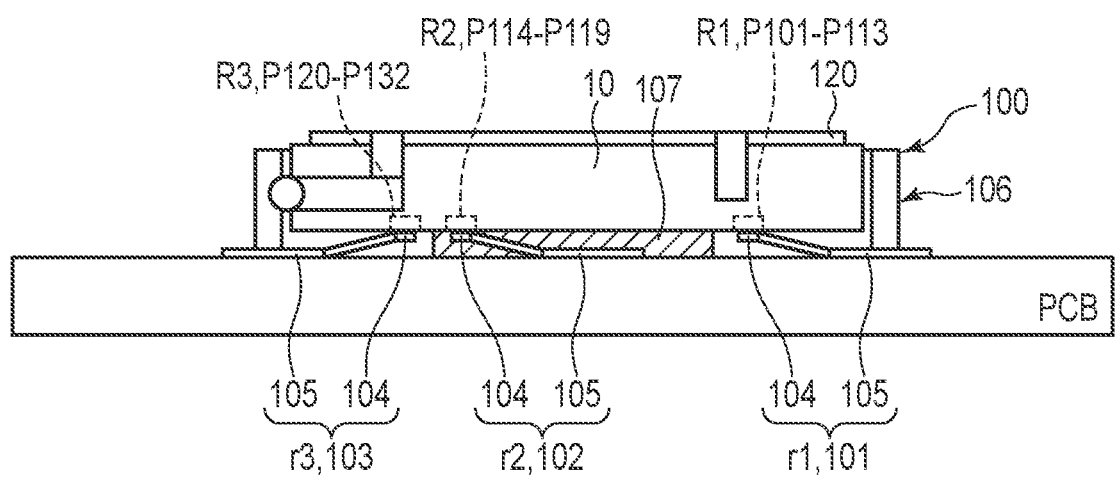
FIG. 5 is a side view showing a state in which the memory device is attached to the connector according to the same embodiment.

FIG. 4 is a plan view showing the external shape of the memory device 10, an external shape of a connector 100 in a host device to which the memory device 10 is attached, and an arrangement example of an area to which a thermal conductive material (TIM: Thermal Interface Material) 107 is attached. (A) of FIG. 4 is a plan view showing the external shape of the memory device 10 and an area (hereinafter referred to as a contact area) A1 in contact with the area to which the TIM 107 is to be attached, and (B) of FIG. 4 is a plan view showing the external shape of the connector 100 and an area (hereinafter referred to as an attachment area) A2 to which the TIM 107 is attached. The memory device 10 is attached from above the connector 100 shown in (B) of FIG. 4 with the terminal surface shown in (A) of FIG. 4 facing down. FIG. 5 is a side view showing a state in which the memory device 10 is attached to the connector 100.

In the connector 100 to which the memory device 10 shown in (A) of FIG. 4 is to be attached, as shown in (B) of FIG. 4, a plurality of lead frames are arranged in three rows of row r1, row r2, and row r3 in a manner corresponding to row R1, row R2, and row R3 of the memory device 10. Lead frames are sometimes referred to as spring leads. In row r1, 13 lead frames 101 corresponding to the 13 terminals P101 to P113 arranged in row R1 of the memory device 10 are arranged. Similarly, in row r2, six lead frames 102 corresponding to the six terminals P114 to P119 arranged in row R2 of the memory device 10 are arranged, and in row r3, 13 lead frames 103 corresponding to the thirteen terminals P120 to P132 arranged in row R3 of the memory device 10 are arranged.

In (B) of FIG. 4, the lengths of the lead frames 101 to the lead frames 103 forming row r1, row r2, and row r3 in the Y-axis direction are the same. However, the lengths of the lead frames 101 to the lead frames 103 in the Y-axis direction are not limited to this example. For example, the lengths of the lead frames 101 to the lead frames 103 in the Y-axis direction may be different from each other.

As shown in FIG. 4B, each of the lead frames 101 to the lead frames 103 includes a lead frame terminal 104 and a mounting portion 105. The lead frame terminal 104 is a portion that comes into contact (point contact) with each of the plurality of terminals P forming row R1, row R2, and row R3 of the memory device 10. The mounting portion 105 is a portion that comes into contact with the printed circuit board when the lead frames 101 to the lead frames 103 are mounted on the printed circuit board in the host device. According to another expression, the mounting portion 105 is a portion fixed on the printed circuit board when the lead frames 101 to the lead frames 103 are mounted on the printed circuit board in the host device.

When the memory device 10 is attached to the connector 100, the lead frame terminals 104 of the lead frames 101 to the lead frames 103 of the connector 100 come into contact with each of the plurality of terminals P forming row R1, row R2, and row R3.

When the lead frame terminals 104 of the lead frames 101 to the lead frames 103 come into contact with the terminals P, a host controller arranged on a system board of the host device and the controller 14 of the memory device 10 are electrically connected.

Note that, in (B) of FIG. 4, the lead frame terminals 104 of the lead frames 101 forming row r1 face the negative direction of the Y-axis. The lead frame terminals 104 of the lead frames 102 forming row r2 face the negative direction of the Y-axis. The lead frame terminals 104 of the lead frames 103 forming row r3 face the positive direction of the Y-axis. Furthermore, the lead frame terminals 104 forming row r1, row r2, and row r3 may also face opposite directions.

As shown in (B) of FIG. 4, the connector 100 is provided with a connector frame 106 that supports the memory device 10 when the memory device 10 is attached. According to another expression, the connector 100 is provided with a connector frame 106 that accommodates the memory device 10 when the memory device 10 is attached. As shown in (B) of FIG. 4, the connector frame 106 includes a first edge 111, a second edge 112, a third edge 113, a fourth edge 114, a connecting portion 115, and a notch 116.

The first edge 111 extends in the X-axis direction and faces in the negative direction of the Y-axis. The first edge 111 comes in contact with the first edge 31 of the memory device 10 when the memory device 10 is attached. The first edge 111 overlaps with the mounting portions 105 of the lead frames 101 forming row r1 in planar view, and is connected (bonded) to the mounting portions 105.

The second edge 112 extends in the Y-axis direction and faces in the negative direction of the X-axis. The second edge 112 comes in contact with the third edge 33 of the memory device 10 when the memory device 10 is attached. The third edge 113 extends in the Y-axis direction and faces in the positive direction of the X-axis. The third edge 113 comes in contact with the second edge 32 of the memory device 10 when the memory device 10 is attached.

The fourth edge 114 extends in the X-axis direction and faces in the positive direction of the Y-axis. The fourth edge 114 comes in contact with the fourth edge 34 of the memory device 10 when the memory device 10 is attached. The fourth edge 114 overlaps with the mounting portions 105 of the lead frames 103 forming row r3 in planar view, and is connected (bonded) to the mounting portions 105.

The connecting portion 115 extends in the X-axis direction and is located between the first edge 111 and the fourth 114, and connects the second edge 112 with the third edge 113. The connecting portion 115 overlaps with the mounting portions 105 of the lead frames 102 forming row r2 in planar view, and is connected (bonded) to the mounting portions 105.

The notch 116 is formed in the second edge 112 and the third edge 113, respectively. As shown in FIG. 5, the notch 116 is hooked with a claw of a cover 120 for fixing the memory device 10 when the memory device 10 is attached to the connector 100.

The TIM 107 is attached to the attachment area A2 denoted by a diagonal line in (B) of FIG. 4. More specifically, as shown in (B) of FIG. 4, in the connector 100, the TIM 107 is attached to an area between row r1 and row r2 and, of the lead frames 102 forming row r2, an area between the lead frame 102 corresponding to the terminal P116 of the memory device 10 and the lead frame 102 corresponding to the terminal P117 of the memory device 10. The TIM 107 is attached on the printed circuit board in the host device.

The contact area A1 surrounded by a broken line in (A) of FIG. 4 and the attachment area A2 to which the TIM 107 is attached denoted by the diagonal line in (B) of FIG. 4 overlap in planar view when the memory device 10 is attached to the connector 100. According to another expression, when the memory device 10 is attached to the connector 100, the memory device 10 in the contact area A1 faces and contacts the TIM 107 attached to the attachment area A2 of the connector 100.

By arranging the terminals P of the memory device 10 as shown in (A) of FIG. 4, in the connector 100 to which the memory device 10 is attached, it is possible to provide the attachment area A2 to which the TIM 107 is attached as shown in (B) of FIG. 4. Generally, in removable memory devices, heat dissipation is performed by securing a heat dissipation path to the printed circuit board in the host device by using the arranged terminals also as terminals for heat dissipation. However, since the terminals arranged on the memory device and the lead frame terminals on the lead frames make only point contact, the heat dissipation area is small and heat dissipation efficiency is poor. In addition, since the lead frame terminals of the lead frames are not soldered to the printed circuit board in the host device, the heat dissipation efficiency is poor due to the thermal resistance of the length from the lead frame terminals of the lead frames to the mounting portions of the lead frames.

In contrast, since the memory device 10 according to the present embodiment reduces the number of terminals P forming row R2 from the number of terminals P forming rows R1 and R3 and realizes a terminal arrangement provided with the contact area A1 shown in (A) of FIG. 4, it is possible to provide on the connector 100 the attachment area A2 to which the TIM 107 is attached. According to this, as shown in FIG. 5, when the memory device 10 is attached to the connector 100, the memory device 10 makes surface contact with the TIM 107 in the contact area A1. Therefore, in comparison to the case of the point contact described above, a heat dissipation area can be further expanded, thereby allowing the heat dissipation efficiency to improve.

Here, with reference to FIG. 6, a case where at least one of the terminals P forming row R3 of the memory device 10 according to the present embodiment is used as a sideband signal configuration select (SCS) terminal will be described.

Figure 6:
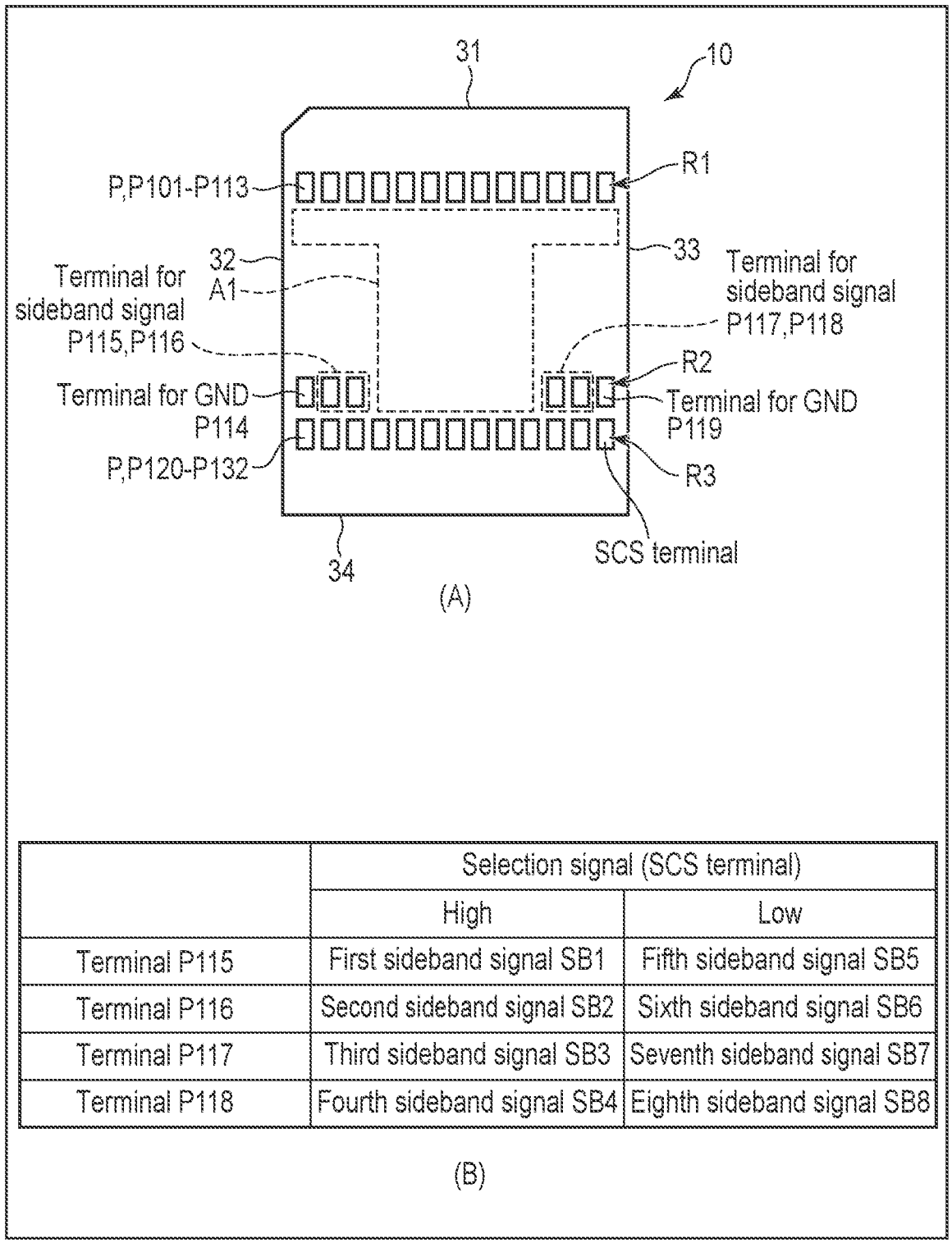
FIG. 6 illustrates a case in which a terminal of the memory device is used as an SCS terminal according to the same embodiment.

FIG. 6 illustrates the case where the terminal P of the memory device 10 is used as the SCS terminal. In (A) of FIG. 6, a case where the terminal P132 belonging to row R3 of the memory device 10 is used as the SCS terminal is assumed. Note that, in (A) of FIG. 6, although the case where the terminal P132 belonging to row R3 of the memory device 10 is used as the SCS terminal is assumed, the example is not limited thereto, and terminals P (terminals P120 to P131) different from the terminal P132 belonging to row R3 of the memory device 10 may also be used as the SCS terminals. Furthermore, although (A) of FIG. 6 assumes a case in which one SCS terminal is provided, it is not limited to this example, and a plurality of SCS terminals may be provided.

Furthermore, in (A) of FIG. 6, of the six terminals P114 to P119 belonging to row R2 of the memory device 10, a case in which four terminals P115 to P118 are used as signal terminals for sideband signals of the PCIe standard, and two terminals P114 and P119 are used as signal terminals (ground terminals) for GND is assumed. However, the assignment of the six terminals P114 to P119 belonging to row R2 of the memory device 10 is not limited to this example, and an arbitrary terminal P of the six terminals P114 to P119 belonging to row R2 of the memory device 10 may be used as the signal terminal for the sideband signal, and an arbitrary terminal P may be used as the signal terminal for GND.

The SCS terminal is a signal terminal for transmitting a signal to change (select) the configuration of the sideband signal from the host device (hereinafter referred to as a selection signal). A high level selection signal or a low level selection signal is input to the SCS terminal from the host device.

As shown in (B) of FIG. 6, in a case where a high level selection signal is input to the SCS terminal, among the terminals belonging to row R2 of the memory device 10, the terminal P115 is used as a signal terminal for transmitting a first sideband signal SB1, the terminal P116 is used as a signal terminal for transmitting a second sideband signal SB2, the terminal P117 is used as a signal terminal for transmitting a third sideband signal SB3, and the terminal P118 is used as a signal terminal for transmitting a fourth sideband signal SB4. According to another expression, in a case where a high level selection signal is input to the SCS terminal, the terminals P115 to P118 belonging to row R2 of the memory device 10 are used as signal terminals for transmitting the sideband signal SB1 to the sideband signal SB4 of a first configuration.

On the other hand, as shown in (B) of FIG. 6, in a case where a low level selection signal is input to the SCS terminal, among the terminals belonging to row R2 of the memory device 10, the terminal P115 is used as a signal terminal for transmitting a fifth sideband signal SB5, the terminal P116 is used as a signal terminal for transmitting a sixth sideband signal SB6, the terminal P117 is used as a signal terminal for transmitting a seventh sideband signal SB7, and the terminal P118 is used as a signal terminal for transmitting an eighth sideband signal SB8. According to another expression, in a case where a low level selection signal is input to the SCS terminal, the terminals P115 to P118 belonging to row R2 of the memory device 10 are used as signal terminals for transmitting the sideband signal SB5 to the sideband signal SB8 of a second configuration.

Note that, FIG. 6 exemplifies a case in which sideband signals that are different between the first configuration and the second configuration are transmitted. However, it is not limited to this example, and sideband signals that are partially in common between the first configuration and the second configuration may be transmitted. For example, the terminal P115 and the terminal P116 may be used to transmit the first sideband signal SB1 and the second sideband signal SB2 regardless of a case where the high level selection signal is input to the SCS terminal or the low level selection signal is input to the SCS terminal, and the terminal P117 and the terminal P118 may be used to transmit the third sideband signal SB3 and the fourth sideband signal SB4 in a case where the high level selection signal is input to the SCS terminal, and may be used to transmit the fifth sideband signal SB5 and the sixth sideband signal SB6 in a case where the low level selection signal is input to the SCS terminal.

Figure 7:
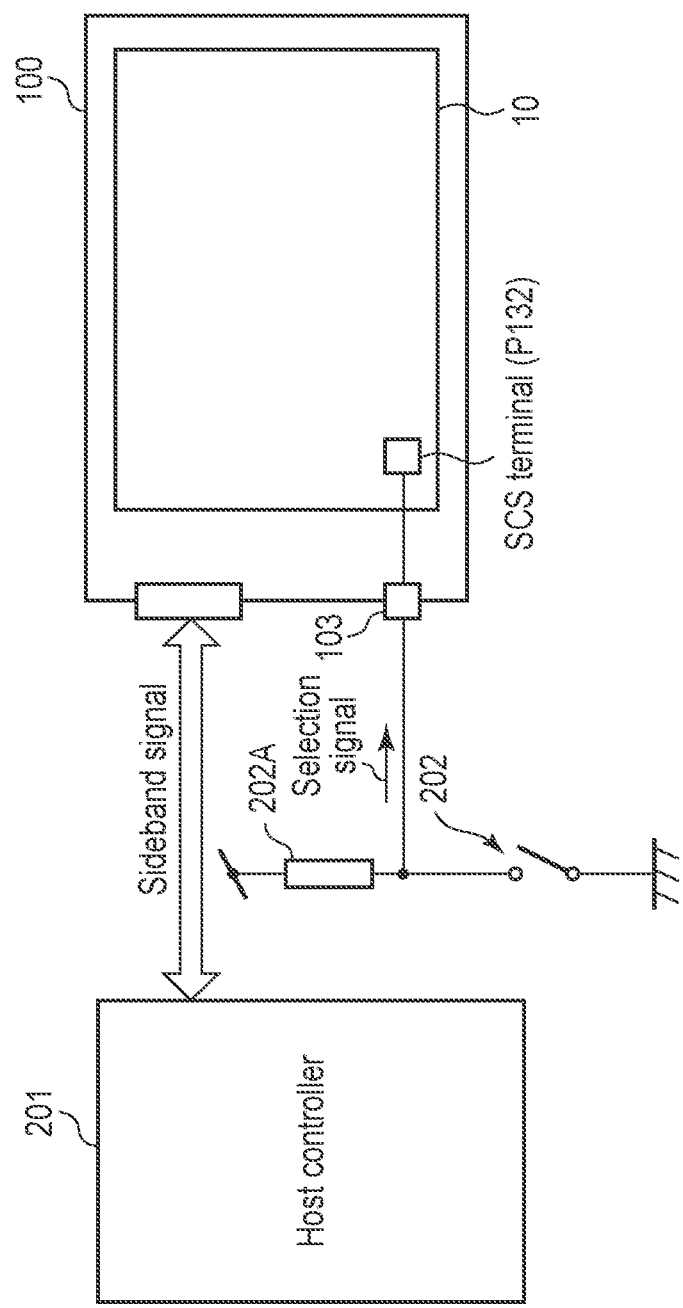
FIG. 7 shows a host controller and a switch disposed on a printed circuit board in a host device that uses the memory device according to the same embodiment.

FIG. 7 shows a host controller 201 and a switch 202 arranged on a printed circuit board in the host device.

The switch 202 on the printed circuit board in the host device is connected to a terminal 103 in the connector 100 via a pull-up resistor 202A, and further connected to the SCS terminal P132 of the memory device 10. By fixing the switch 202 on or off, the level of the SCS terminal can be selected.

In a method not shown in the drawing, the level of the SCS terminal can be selected from the host controller 201 by directly connecting a GPIO output of the host controller 201 to the terminal 103 in the connector 100. Furthermore, in a case where the level of the SCS terminal is not selected, the level can be fixed by a pull-up resistor or a pull-down resistor.

As shown in FIG. 7, one end of the switch 202 is grounded and the other end is connected to the pull-up resistor 202A and the lead frame 103 which contacts the SCS terminal. When the switch 202 is turned off, a high level selection signal is input to the SCS terminal of the memory device 10 via the lead frame 103. When the high level selection signal is input to the SCS terminal, as shown in (B) of FIG. 6, the terminal P115 to the terminal P118 belonging to row R2 function as signal terminals for transmitting the first sideband signal SB1 to the fourth sideband signal SB4 of the first configuration. On the other hand, when the switch 202 is turned on, a low level selection signal is input to the SCS terminal of the memory device 10 via the lead frame 103. When the low level selection signal is input to the SCS terminal, as shown in (B) of FIG. 6, the terminal P115 to the terminal P118 belonging to row R2 function as signal terminals for transmitting the fifth sideband signal SB5 to the eighth sideband signal SB8.

Next, with reference to FIG. 8, a power supply voltage supplied to the memory device 10 of the present embodiment will be described.

Figure 8:
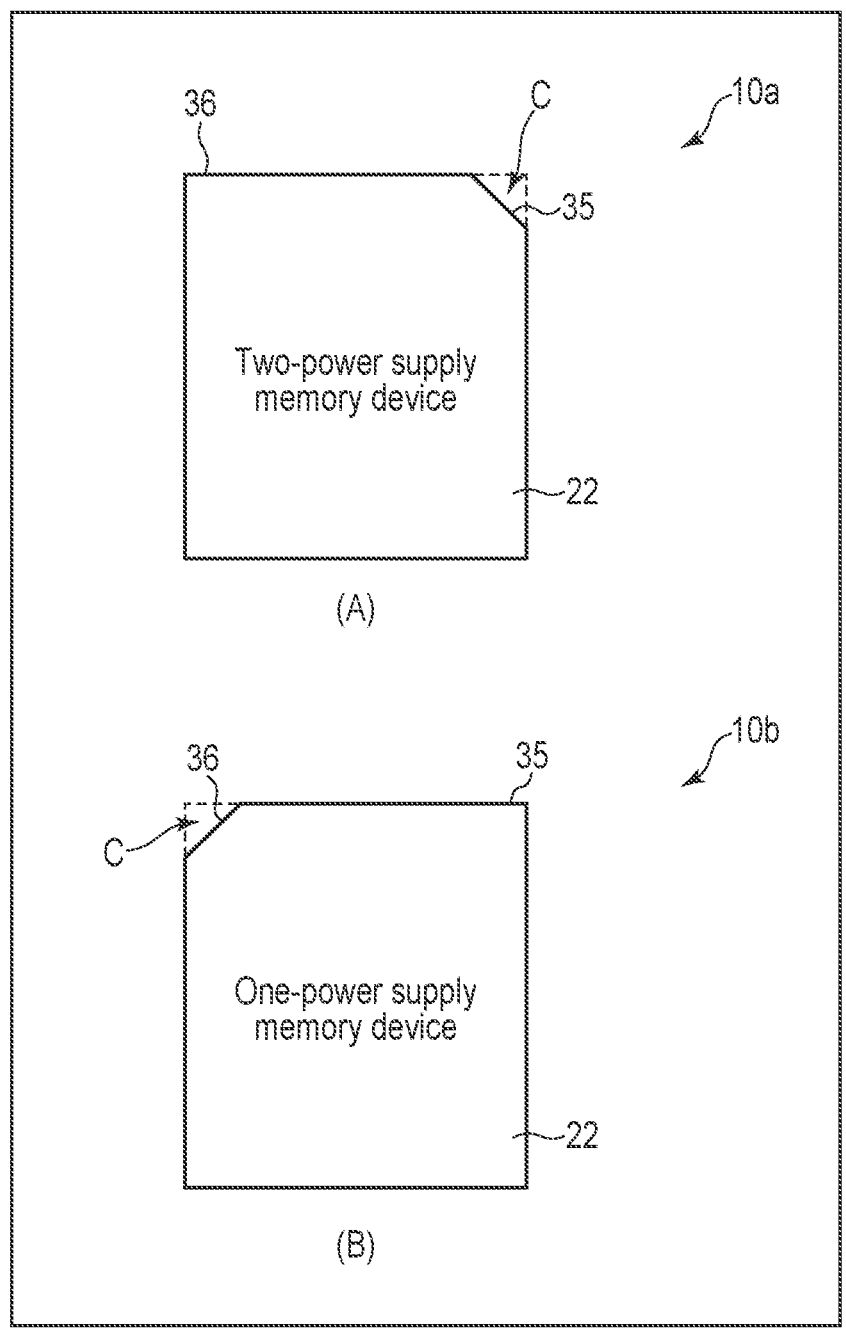
FIG. 8 is a plan view showing external shapes of a two-power supply memory device and a one-power supply memory device which are the memory devices according to the same embodiment.

FIG. 8 is a plan view showing external shapes of a first-generation memory device 10a and a second-generation memory device 10b. The first-generation memory device 10a is configured to operate with n types of externally supplied power supply voltages (n≥2). On the other hand, the second-generation memory device 10b is configured to operate with m types of externally supplied power supply voltages (n>m≥1, where n and m are natural numbers). For this reason, the market may contain a mixture of first-generation memory devices 10a and second-generation memory devices 10b. In the following, it is assumed that the first-generation memory device 10a is a memory device configured to operate with two types of power supply voltages. The memory device 10a is referred to as a two-power supply memory device. On the other hand, the memory device 10b is referred to as a one-power supply memory device.

In a case where manufacturing and shipping of the second-generation memory device, such as the one-power supply memory device 10b, are started sometime after starting manufacturing and shipping of the first-generation memory device, such as the two-power supply memory device 10a, as described above, an environment with a mixture of the first-generation memory device and the second-generation memory device having different specifications from each other will be obtained.

Thus, for example, in a product manufacturing line that manufactures a host device such as an information processing device, in some cases, manufacturing and operation tests of a first type host configured to supply two types of power supply voltages, and manufacturing and operation tests of a second type host configured to supply one type of power supply voltage are performed.

The first type host is an information processing device configured to supply two types of power supply voltages to the two-power supply memory device 10a attached to the connector in the host device. On the other hand, the second type host is an information processing device configured to supply one type of power supply voltage to the one-power supply memory device 10b attached to the connector in the host device.

In the case where the two-power supply memory device 10a and the one-power supply memory device 10b have the same memory device shape, in the product manufacturing line, a case in which the operation test of the first type host is performed in a state where the one-power supply memory device 10b is mistakenly attached to the connector of the first type host, and a case in which the operation test of the second type host is performed in a state where the two-power supply memory device 10a is mistakenly attached to the connector of the second type host may occur.

In the operation test of the host device, the host device is powered on, whereby the host device supplies several types of power supply voltages corresponding to the type of the host device to the memory device. If the operation test of the host device is executed in a state where the power supply voltage supplied by the host device does not match the power supply configuration of the memory device, there is a risk of a problem such that the memory device may be damaged due to a voltage that is not guaranteed to operate the memory device being applied, or a large current flow causing ignition.

Therefore, in order to suppress the occurrence of such a problem, the memory device shapes of the two-power supply memory device 10*a* and the one-power supply memory device 10*b* are devised to be formed differently to make the two-power supply memory device 10*a* and the one-power supply memory device 10*b* distinguishable. For example, as shown in (A) of FIG. 8, in the two-power supply memory device 10*a*, the first corner portion 35 is formed as in the corner chamfered portion C, whereas, as shown in (B) of FIG. 8, in the one-power supply memory device 10*b*, the second corner portion 36 is formed as in the corner chamfered portion C. According to this, the one-power supply memory device 10*b* cannot be attached to the connector of the first type host, and the two-power supply memory device 10*a* cannot be attached to the connector of the second type host. Therefore, it is possible to suppress the occurrence of the above-mentioned problem.

In FIG. 8, a case of suppressing the problem of the one-power supply memory device 10*b* being mistakenly attached to the connector of the first type host and the two-power supply memory device 10*a* being mistakenly attached to the connector of the second type host is explained by forming the memory device shapes of the two-power supply memory device 10*a* and the one-power supply memory device 10*b* differently from each other. On the other hand, it may be considered suppressing the occurrence of the above-mentioned problem by using at least one of the terminals P forming row R3 of memory device 10 as a power configuration detect (PCD) terminal. In the following, a case of using at least one of the terminals P forming row R3 of the memory device 10 according to the present embodiment as the PCD terminal will be explained with reference to FIG. 9.

FIG. 9 illustrates the case where the terminal P of the memory device 10 is used as the PCD terminal. In (A) of FIG. 9, a case in which the terminal P131 belonging to row R3 of the memory device 10 is used as the PCD terminal is assumed. Furthermore, in (A) of FIG. 9, a case in which the terminal P132 belonging to row R3 of the memory device 10 is used as the SCS terminal in the same manner as in the case of (A) of FIG. 6 is assumed. Note that, in (A) of FIG. 9, a case in which the terminal P131 belonging to row R3 of the memory device 10 is used as the PCD terminal is assumed. However, it is not limited to this example, and the terminal P (terminal P120 to terminal P130) that is different from the terminal P131 and the terminal P132 belonging to row R3 of the memory device 10 may also be used as the PCD terminal. Furthermore, in (A) of FIG. 9, a case of one PCD terminal is assumed; however, it is not limited to this example, and a plurality of PCD terminals may be provided.

The PCD terminal is a signal terminal for transmitting a signal for detecting the power supply configuration of the memory device 10 (hereinafter referred to as a detection signal). From the PCD terminal, a high level detection signal or a low level detection signal is output to the host device.

As shown in (B) of FIG. 9, in a case where a high level detection signal is output from the PCD terminal, the host device recognizes that the power supply configuration of the memory device 10 is a two-power supply. According to another expression, in a case where a high level detection signal is output from the PCD terminal, the host device recognizes that the memory device attached to the connector 100 is the two-power supply memory device 10*a*. On the other hand, in a case where a low level detection signal is output from the PCD terminal, the host device recognizes that the power supply configuration of the memory device 10 is a one-power supply. According to another expression, in a case where a low level detection signal is output from the PCD terminal, the host device recognizes that the memory device attached to the connector 100 is the one-power supply memory device 10*b*.

Figure 10:
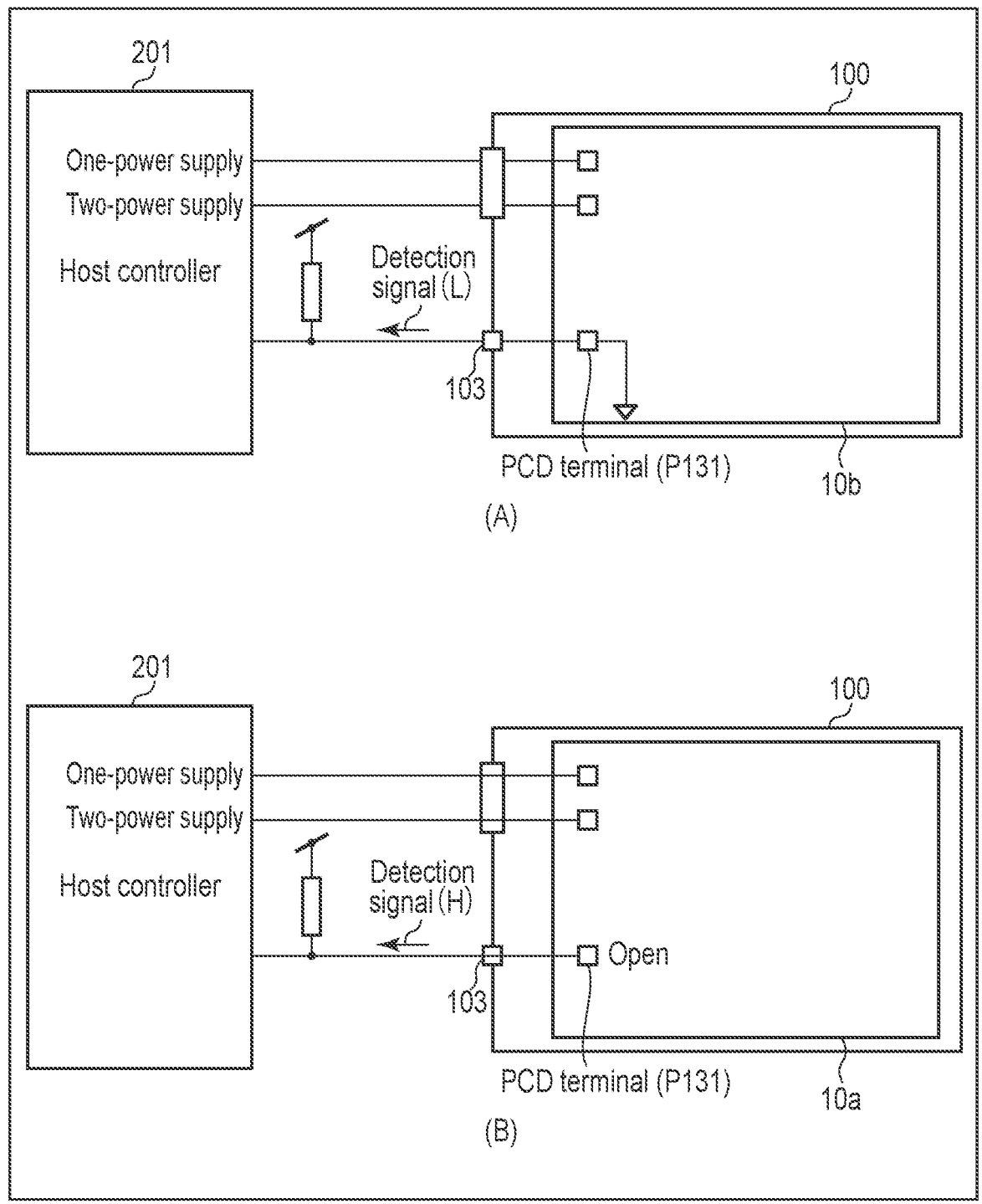
FIG. 10 shows internal circuits of the two-power supply memory device and the one-power supply memory device which are the memory devices according to the same embodiment.

FIG. 10 shows an internal circuit connected to the PCD terminal of the one-power supply memory device 10*b* and an internal circuit connected to the two-power supply memory device 10*a*.

As shown in (A) of FIG. 10, the PCD terminal of the one-power supply memory device 10*b* is connected to a GND within the device 10*b*. Therefore, when a first power supply voltage is supplied to the one-power supply memory device 10*b* under the control of the host controller 201, the GND is grounded, and the low level detection signal is output from the PCD terminal of the one-power supply memory device 10*b*.

On the other hand, as shown in (B) of FIG. 10, the PCD terminal of the two-power supply memory device 10*a* is open. Therefore, a high level detection signal is input to the host device via a pull-up resistor on the printed circuit board in the host device.

According to the configuration shown in FIG. 10, the host device (host controller 201) is capable of recognizing the power supply configuration of the memory device 10 according to the level of the detection signal that is output at the time the first power supply voltage is supplied, and can determine whether or not a second power supply voltage is supplied. Therefore, it is possible to suppress the occurrence of the problem mentioned above.

Figure 11:
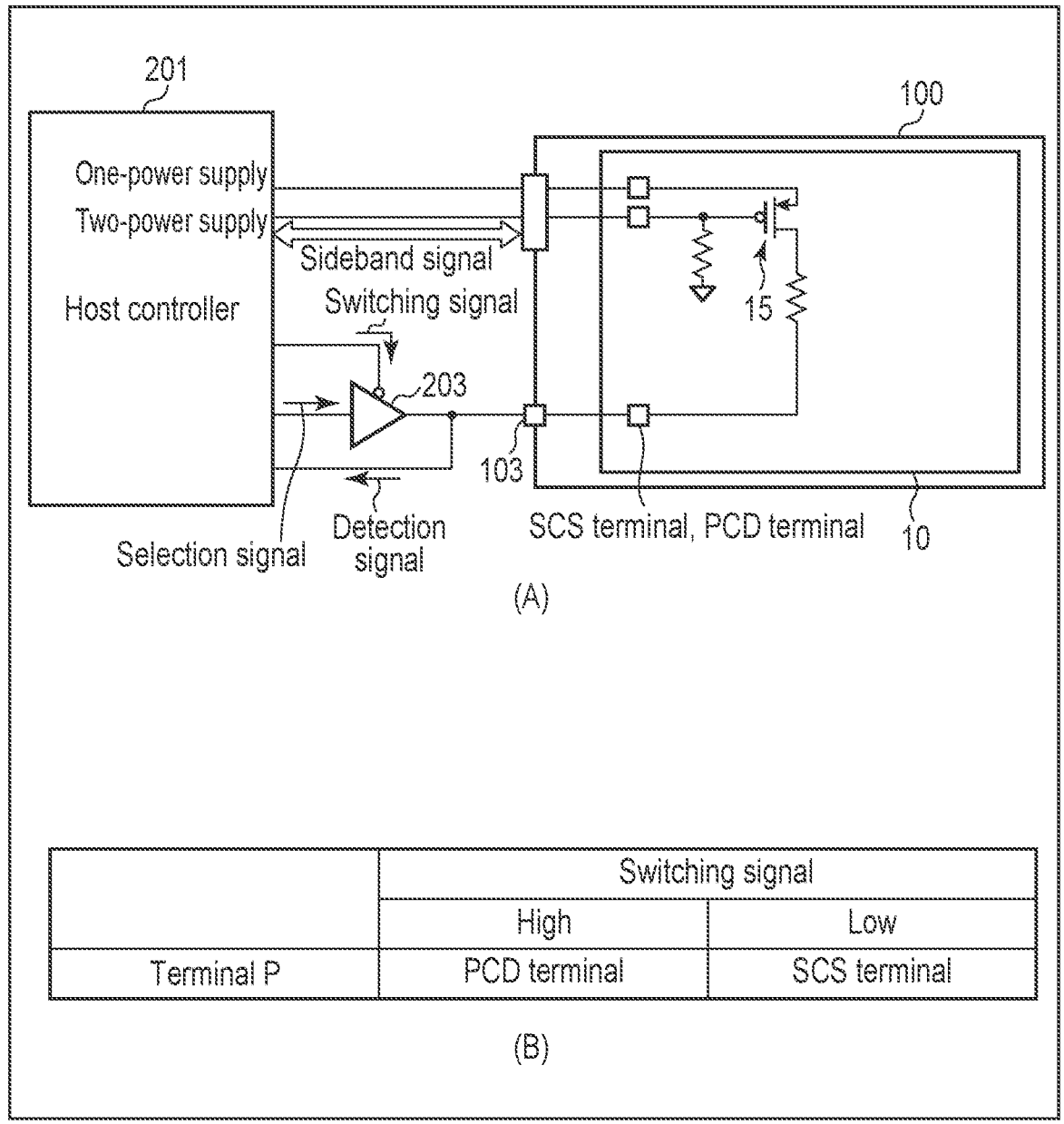
FIG. 11 illustrates a case in which one of the terminals of the memory device according to the same embodiment is used both as the SCS terminal and the PCD terminal.

Here, with reference to FIG. 11, a case in which one of the terminals P of the memory device 10 according to the present embodiment is used both as the SCS terminal and as the PCD terminal will be described. FIG. 11 illustrates the case where one of the terminals P of the memory device 10 is used both as the SCS terminal and as the PCD terminal.

As described above, the SCS terminal is a signal terminal used to input a selection signal, and the PCD terminal is a signal terminal used to output a detection signal. Therefore, as long as the timing at which the selection signal is input and the timing at which the detection signal is output do not overlap, a single terminal P can function as both the SCS terminal and the PCD terminal.

In order to have a single terminal P function both as the SCS terminal and the PCD terminal, as shown in (A) of FIG. 11, for example, a three-state buffer 203 is provided between the host controller 201 of the host device and the lead frame 103 that contacts one terminal P that functions as both the SCS terminal and the PCD terminal. The three-state buffer 203 may be contained within the host controller 201.

As shown in (B) of FIG. 11, in a case where one terminal P is caused to function as the SCS terminal, a low level switching signal is input to the three-state buffer 203 by the host controller 201. In this case, it is possible to cause one terminal P to function as the SCS terminal so that the three-state buffer 203 may output the selection signal output by the host controller 201 to the memory device 10 as it is.

Note that, under the control of the host controller 201, when the second power supply voltage is supplied to the two-power supply memory device 10*a*, the switch 15 may be turned off, and the connection between a line for supplying the first power supply voltage and the pull-up resistor may be disconnected. Alternatively, a disconnection circuit not shown in the drawing is provided, and when the second power supply voltage is supplied to the two-power supply memory device 10*a* and an initialization sequence is executed, the disconnection circuit may disconnect the connection between the line for supplying the first power supply voltage and the pull-up resistor. According to this, it is possible to suppress extra power consumption by the pull-up resistor after the detection signal is output from the PCD terminal.

On the other hand, in a case where one terminal P is caused to function as the PCD terminal, as shown in (B) of FIG. 11, a high level switching signal is input to the three-state buffer 203 by the host controller 201. When the high level switching signal is input by the host controller 201, the three-state buffer 203 enters a high impedance state and becomes an electrically disconnected state. Therefore, signals will not be output from the three-state buffer 203 to the memory device 10, and one terminal P can function as the PCD terminal.

FIG. 12 shows a timing chart of an operation example in a case where one of the terminals P of the memory device 10 according to the present embodiment is used both as the SCS terminal and the PCD terminal.

As shown in FIG. 12, at a first timing T1, the host controller 201 starts outputting a high level switching signal to the three-state buffer 203. According to this, a predetermined terminal P of the memory device 10 functions as the PCD terminal. Subsequently, at a second timing T2, under the control of the host controller 201, the first power supply voltage starts to be supplied to the memory device 10. When the first power supply voltage starts to be supplied to the memory device 10, at a third timing T3, the detection signal output from the PCD terminal of the memory device 10 is input to the host controller 201. According to this, the host controller 201 can recognize the power supply configuration of the memory device 10 and determine whether or not to supply the second power supply voltage.

At a fourth timing T4 after the power supply configuration of the memory device 10 is recognized, the host controller 201 switches the level of the switching signal output to the three-state buffer 203 from high to low. According to this, the above-mentioned predetermined terminal P of the memory device 10 functions as the SCS terminal. Thereafter, the high level or low level selection signal is output from the host controller 201 to the memory device 10, and the terminal for the sideband signal arranged on memory device 10 is used as a signal terminal for transmitting the sideband signal of the first configuration corresponding to the high level selection signal, or as a signal terminal for transmitting the sideband signal of the second configuration corresponding to the low level selection signal.

The following describes a modified example of the arrangement of the plurality of terminals P provided on the memory device 10. Note that, in the following, only those portions basically different from the terminal arrangement shown in FIG. 4 will be mentioned, and the description of the portions similar to FIG. 4 will be omitted. Note that, in any terminal arrangement, the distance between row R1 and row R3 in the Y-axis direction is longer than the distance between row R1 and the first edge 31 in the Y-axis direction, and the distance between row R3 and the fourth edge 34 in the Y-axis direction.

First Modified Example

Figure 13:
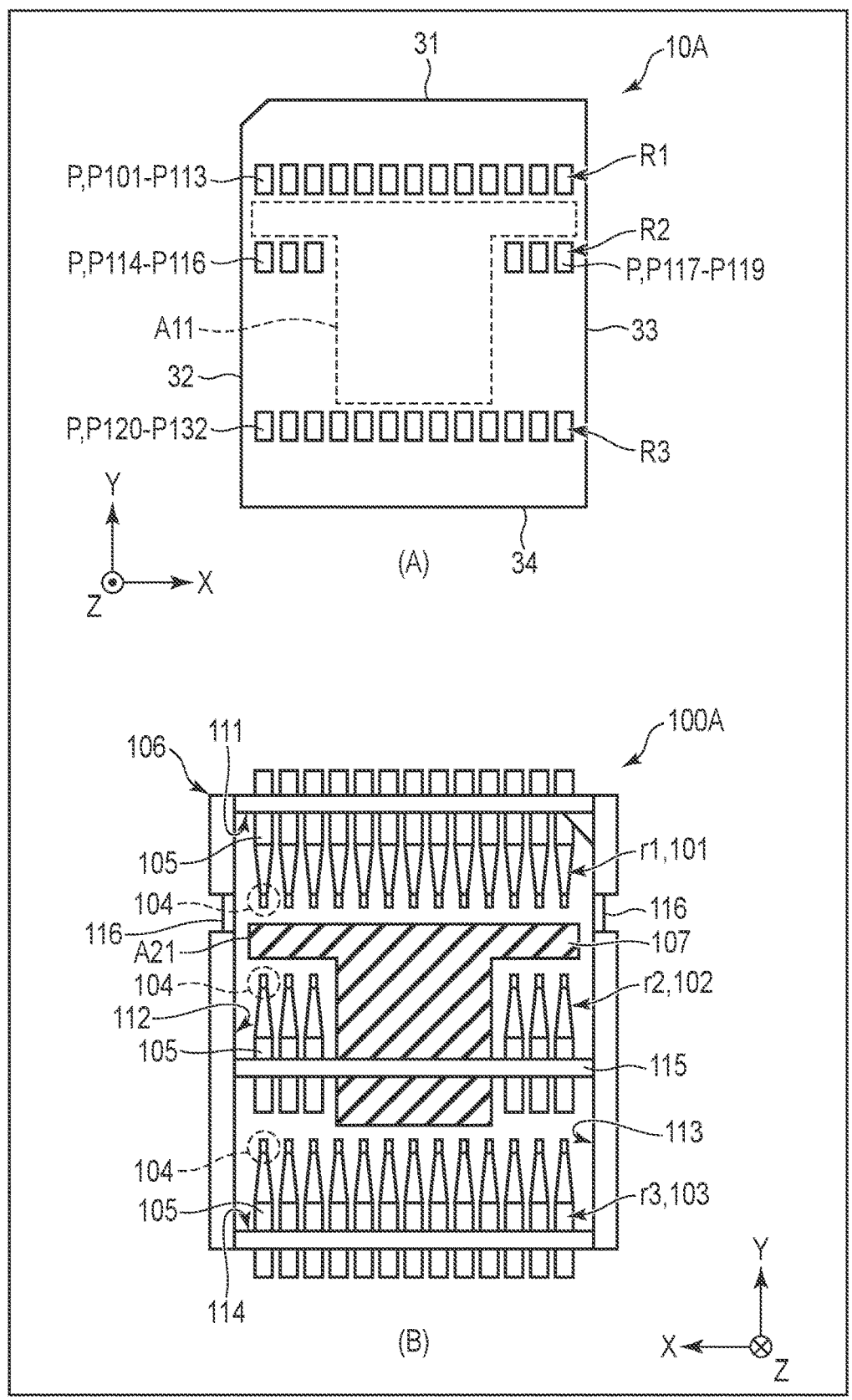
FIG. 13 is a plan view showing an external shape of a memory device, an external shape of a connector to which the memory device is attached, and an arrangement example of an area to which a TIM is attached according to a first modified example.

FIG. 13 is a plan view showing an external shape of a memory device 10A, an external shape of a connector 100A in a host device to which the memory device 10A is attached, and an arrangement example of an area to which a TIM 107 is attached according to a first modified example. (A) of FIG. 13 is a plan view showing the external shape of the memory device 10A and a contact area A11 that contacts the TIM 107, and (B) of FIG. 13 is a plan view showing the external shape of the connector 100A and an attachment area A21 to which the TIM 107 is attached.

A terminal arrangement shown in (A) of FIG. 13 is different from the terminal arrangement shown in (A) of FIG. 4 in that the location of six terminals P114 to P119 forming row R2 is closer to a first edge 31 than to a fourth edge 34.

For this reason, in the connector 100A to which the memory device 10A shown in (A) of FIG. 13 is attached, as shown in (B) of FIG. 13, a lead frame terminal 104 of a lead frame 101 forming row r1 faces a negative direction of a Y-axis, the lead frame terminal 104 of a lead frame 102 forming row r2 faces a positive direction of the Y-axis, and the lead frame terminal 104 of a lead frame 103 forming row r3 faces the positive direction of the Y-axis.

As shown in (B) of FIG. 13, in the connector 100A, the TIM 107 is attached to an area between row r1 and row r2 and, of the lead frames 102 forming row r2, an area between the lead frame 102 corresponding to a terminal P116 of the memory device 10A and the lead frame 102 corresponding to a terminal P117 of the memory device 10A. The TIM 107 is attached to the attachment area A21 denoted by a diagonal line in (B) of FIG. 13.

The contact area A11 surrounded by a broken line in (A) of FIG. 13 and the attachment area A21 to which the TIM 107 is attached denoted by the diagonal line in (B) of FIG. 13 overlap in planar view when the memory device 10A is attached to the connector 100A. According to another expression, when the memory device 10A is attached to the connector 100A, the contact area A11 of the memory device 10A faces and contacts the TIM 107 attached to the attachment area A21 of the connector 100A.

As explained above, by arranging the terminals P of the memory device 10A as shown in (A) of FIG. 13, in the connector 100A to which the memory device 10A is attached, it is possible to provide the attachment area A21 to which the TIM 107 is attached as shown in (B) of FIG. 13. According to another expression, since the memory device 10A reduces the number of terminals P forming row R2 from the number of terminals P forming rows R1 and R3 and realizes a terminal arrangement that provides the contact area A11 shown in (A) of FIG. 13, it is possible to provide on the connector 100A the attachment area A21 to which the TIM 107 is attached. According to this, when memory device 10A is attached to connector 100A, the memory device 10A makes surface contact with the TIM 107 in the contact area A11. Therefore, similar to the case of the terminal arrangement shown in FIG. 4, heat dissipation efficiency can be improved.

Second Modified Example

Figure 14:
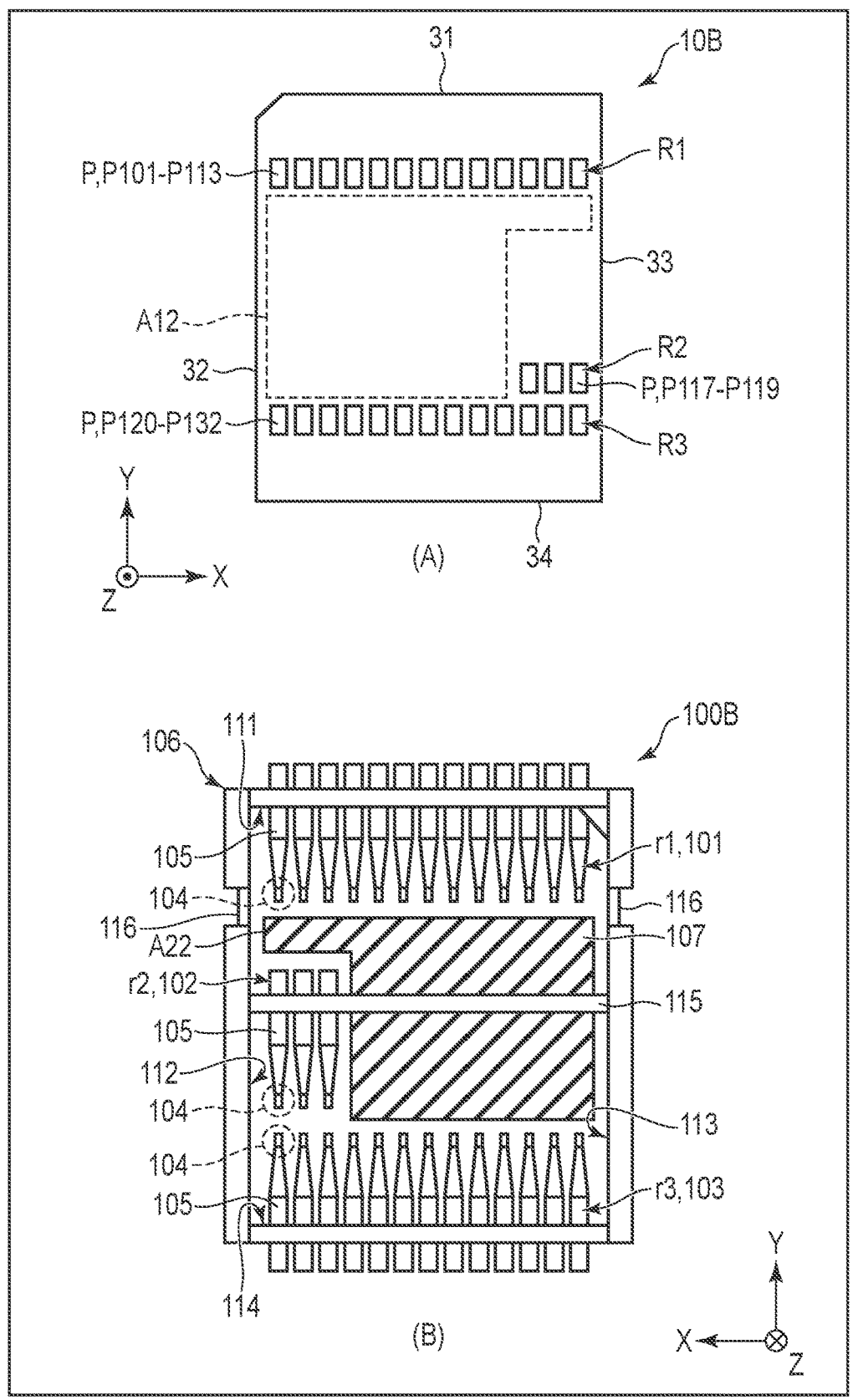
FIG. 14 is a plan view showing an external shape of a memory device, an external shape of a connector to which the memory device is attached, and an arrangement example of an area to which a TIM is attached according to a second modified example.

FIG. 14 is a plan view showing an external shape of a memory device 10B, an external shape of a connector 100B to which the memory device 10B is attached, and an arrangement example of an area to which a TIM 107 is attached according to a second modified example. (A) of FIG. 14 is a plan view showing the external shape of the memory device 10B and a contact area A12 that contacts the TIM 107, and (B) of FIG. 14 is a plan view showing the external shape of the connector 100B and an attachment area A22 to which the TIM 107 is attached.

A terminal arrangement shown in (A) of FIG. 14 is different from the terminal arrangement shown in (A) of FIG. 4 in that the number of terminals P forming row R2 is reduced from six to three. Specifically, the terminal arrangement shown in (A) of FIG. 14 differs from the terminal arrangement shown in (A) of FIG. 4 in that the terminals P114 to P116 shown in FIG. 4 are not arranged as terminals P forming row R2.

Of three terminals P117 to P119 forming row R2 shown in (A) of FIG. 14, the two terminals P117 and P118 are used as signal terminals for PCIe standard sideband signals, and one terminal P119 is used as a signal terminal for GND. However, the assignment of the three terminals P117 to P119 belonging to row R2 of the memory device 10B are not limited to this example. Therefore, among the three terminals P117 to P119 belonging to row R2 of the memory device 10B, an arbitrary terminal P may be used as a signal terminal for a sideband signal, and an arbitrary terminal P may be used as a signal terminal for GND.

As shown in (B) of FIG. 14, in the connector 100B, the TIM 107 is attached to an area between row r1 and row r2 and an area between a lead frame 102 corresponding to the terminal P117 of the memory device 10B and a third edge 113 of a connector frame 106. The TIM 107 is attached to the attachment area A22 denoted by a diagonal line in (B) of FIG. 14.

The contact area A12 surrounded by a broken line in (A) of FIG. 14 and the attachment area A22 to which the TIM 107 is attached denoted by the diagonal line in (B) of FIG. 14 overlap in planar view when the memory device 10B is attached to the connector 100B. According to another expression, when the memory device 10B is attached to the connector 100B, the contact area A12 of the memory device 10B faces and contacts the TIM 107 attached to the attachment area A22 of the connector 100B.

As explained above, by arranging the terminals P of the memory device 10B as shown in (A) of FIG. 14, in the connector 100B to which the memory device 10B is attached, it is possible to provide the attachment area A22 to which the TIM 107 is attached as shown in (B) of FIG. 14. According to another expression, since the memory device 10B reduces the number of terminals P forming row R2 from the number of terminals P forming rows R1 and R3 and realizes the terminal arrangement that provides the contact area A12 shown in (A) of FIG. 14, it is possible to provide on the connector 100B the attachment area A22 to which the TIM 107 is attached. Therefore, in comparison to the terminal arrangements shown in FIG. 4 and FIG. 13, the terminal arrangement shown in FIG. 14 can expand a surface contact area with the TIM 107 and allow the heat dissipation efficiency to further improve.

Note that, in FIG. 14, a terminal arrangement in which the terminals P114 to P116 shown in FIG. 4 are not arranged as the terminals P forming row R2, and the terminals P117 to P119 are arranged as the terminals P forming row R2 is shown; however, the terminal arrangement is not limited thereto. For example, the terminal arrangement may be such that the terminals P117 to P119 shown in FIG. 4 are not arranged as the terminals P forming row R2, and the terminals P114 to P116 are arranged as the terminals P forming row R2. Even with this terminal arrangement, it is possible to achieve the same effect as the terminal arrangement shown in FIG. 14.

Furthermore, FIG. 14 shows a case in which the terminals P117 to P119 forming row R2 are provided at a location closer to a fourth edge 34 than to a first edge 31 of the memory device 10B; however, it is not limited thereto. For example, the terminal arrangement may be such that the terminals P117 to P119 forming row R2 are provided at a location closer to the first edge 31 than to the fourth edge 34 of memory device 10B. Even with this terminal arrangement, it is possible to achieve the same effect as the terminal arrangement shown in FIG. 14.

Furthermore, the memory device 10 of (A) of FIG. 4 can also be attached to the connector 100B of (B) of FIG. 14. In this case, the terminals P114 to P116 of row R2 come in contact with the TIM 107; however, an insulating TIM is used to avoid short-circuit, or the unconnected terminals P114 to P116 can be opened in a default state so as not to become an output mode, where an input is also a through-current-preventive I/O cell.

Third Modified Example

FIG. 15 is a plan view showing an external shape of a memory device 10C, an external shape of a connector 100C in a host device to which the memory device 10C is attached, and an arrangement example of an area to which a TIM 107 is attached according to a third modified example. (A) of FIG. 15 is a plan view showing the external shape of the memory device 10C and a contact area A13 that contacts the TIM 107, and (B) of FIG. 15 is a plan view showing the external shape of the connector 100C and an attachment area A23 to which the TIM 107 is attached.

A terminal arrangement shown in (A) of FIG. 15 is different from the terminal arrangement shown in (A) of FIG. 4 in that terminals P forming row R2 are not provided. That is, the terminal arrangement shown in (A) of FIG. 15 is a terminal arrangement in which signal terminals for PCIe standard sideband signals are not provided.

In this case, as shown in (B) of FIG. 15, the TIM 107 is attached to an area between row r1 and row r3 in the connector 100C. According to another expression, the TIM 107 is attached to the attachment area A23 denoted by a diagonal line in (B) of FIG. 14.

The contact area A13 surrounded by a broken line in (A) of FIG. 15 and the attachment area A23 to which the TIM 107 is attached denoted by the diagonal line in (B) of FIG. 14 overlap in planar view when the memory device 10C is attached to the connector 100C. According to another expression, when the memory device 10C is attached to the connector 100C, the contact area A13 of the memory device 10C faces and contacts the TIM 107 attached to the attachment area A23 of the connector 100C.

As explained above, by arranging terminals P of the memory device 10C as shown in (A) of FIG. 15, in the connector 100C to which the memory device 10C is attached, it is possible to provide the attachment area A23 to which the TIM 107 is attached as shown in (B) of FIG. 15. According to another expression, since the memory device 10C realizes the terminal arrangement in which the contact area A13 shown in (A) of FIG. 15 is provided by not providing terminals P that form row R2, it is possible to provide on the connector 100C the attachment area A23 to which the TIM 107 is attached. Note that the contact area A13 that is provided by the terminal arrangement shown in FIG. 15 is wider than the contact area A1 and the contact area A11 shown in FIG. 4 and FIG. 13, and the contact area A12 shown in FIG. 14 in that there is no terminal P forming row R2. Therefore, in comparison to the terminal arrangements shown in FIG. 4, FIG. 13, and FIG. 14, the terminal arrangement shown in FIG. 15 can expand a surface contact area with the TIM 107 and allow the heat dissipation efficiency to further improve.

Furthermore, it is also possible to attach the memory device 10 and the memory device 10A of (A) of FIG. 4 and (A) of FIG. 13 to the connector 100C of (B) of FIG. 15. In this case, the terminals P114 to P116 and the terminals P117 to P119 of row R2 come in contact with the TIM 107; however, an insulating TIM is used to avoid short-circuit, or the unconnected terminals P114 to P116 and P117 to P119 can be opened in a default state so as not to become an output mode, where an input is also a through-current-preventive I/O cell.

Fourth Modified Example

FIG. 16 is a plan view showing an external shape of a memory device 10D, an external shape of a connector 100D to which the memory device 10D is attached, and an arrangement example of an area to which a TIM 107 is attached according to a fourth modified example. (A) of FIG. 16 is a plan view showing the external shape of the memory device 10D and a contact area A14 that contacts the TIM 107, and (B) of FIG. 16 is a plan view showing the external shape of the connector 100D and an attachment area A24 to which the TIM 107 is attached.

A terminal arrangement shown in (A) of FIG. 16 is different from the terminal arrangement shown in (A) of FIG. 4 in that a length of a lead frame 103 of the connector 100 in a Y-axis direction shown in (B) of FIG. 16 is longer than the length of the lead frame 103 in the Y-axis direction shown in (B) of FIG. 4, which causes a location of row R3 in the Y-axis direction to become closer to the first edge 31. Specifically, in the case of the terminal arrangement shown in (A) of FIG. 16, the location of row R3 in the Y-axis direction is closer to the first edge 31 by approximately one row (a length of terminal P in the Y-direction) in comparison to the terminal arrangement show in (A) of FIG. 4.

In this case, as shown in (B) of FIG. 16, the TIM 107 is attached to an area between row r1 and row r3 in the connector 100D. The TIM 107 is attached to the attachment area A24 denoted by a diagonal line in (B) of FIG. 16.

The contact area A14 surrounded by a broken line in (A) of FIG. 16 and the attachment area A24 to which the TIM 107 is attached denoted by the diagonal line in (B) of FIG. 16 overlap in planar view when the memory device 10D is attached to the connector 100D. According to another expression, when the memory device 10D is attached to the connector 100D, the contact area A14 of the memory device 10D faces and contacts the TIM 107 attached to the attachment area A24 of the connector 100D.

As explained above, even if the length of the lead frame 103 in the Y-axis direction is longer than in the case shown in (B) of FIG. 4, by arranging the terminals P of the memory device 10D as shown in (A) of FIG. 16, in the connector 100D to which the memory device 10D is attached, it is possible to provide the attachment area A24 to which the TIM 107 is attached as shown in (B) of FIG. 16. Even with the terminal arrangement shown in FIG. 16, it is possible to improve heat dissipation efficiency compared to the case of the point contact described above.

As one example is shown in the fourth modified example, the memory device 10 of the present embodiment can be provided with the contact area A1 that comes in contact with the TIM 107 by devising the terminal arrangement of a plurality of terminals P regardless of the length of the lead frame 103 of the connector 100 in the Y-axis direction, and heat dissipation efficiency of the memory device 10 can be improved.

Note that, in the present embodiment, it is assumed that the terminal P is not arranged in the contact area A1 provided in the memory device 10; however, it is not limited to this example. Therefore, the terminal P may also be arranged within the contact area A1 provided in the memory device 10. However, since the terminal P arranged in the contact area A1 comes in contact with the TIM 107 when the memory device 10 is attached to the connector 100, the terminal P cannot be used as a signal terminal for the sideband signal or a signal terminal for GND. However, even in this case, since the memory device 10 can make surface contact with the TIM 107, it is possible to improve the heat dissipation efficiency of the memory device 10.

Furthermore, the sideband signal in the present embodiment may also be referred to as an optional signal.

According to the first embodiment described above, the memory device 10 (10C) includes a plurality of signal terminals used for signal transmission and comprises a plurality of terminals P exposed on the first surface 21 of the main body 11. The plurality of terminals P form at least row R1 and row R3. Row R1 includes a plurality of signal terminals P arranged at intervals from each other in the X-axis direction at a location closer to the first edge 31 than to the fourth edge 34 of the main body 11. Row R3 includes a plurality of signal terminals P arranged at intervals from each other in the X-axis direction at a location closer to the fourth edge 34 than to the first edge 31 of the main body 11. An area between row R1 and row R3 of the first surface 21 of the main body 11 includes the contact area A1 (A13) that comes in contact with the TIM 107 arranged on the printed circuit board of the host device that is electrically connected. Therefore, since the memory device 10 (10C) can make surface contact with the TIM 107 in the contact area A1 (A13) when the memory device 10 (10C) is attached to the connector 100 (100C), it is possible to improve the heat dissipation efficiency of the memory device 10 (10C).

Second Embodiment

Next, a second embodiment will be described. Note that a detailed description of the matters already described in the first embodiment above will be omitted, and matters that differ from the first embodiment above will mainly be described below.

FIG. 17 shows an example of a pin assignment of a group of terminals P101 to P113 belonging to row R1 of a memory device 10. The group of terminals P101 to P113 belonging to row R1 is used as a signal terminal for transmitting a differential signal pair for two lanes compliant with the PCIe standard, and as a ground terminal for noise guard.

As shown in FIG. 17, terminals P101, P104, P107, P110, and P113 are used as ground terminals for noise guard (GND terminals), and are assigned ground potentials. Terminals P102 and P103, P105 and P106, P108 and P109, and P111 and P112 are used as signal terminals for transmitting differential signal pairs compliant with the PCIe standard.

Receiver differential signals Rx0 output from the host device are assigned to the terminals P102 and P103. Receiver differential signals may be referred to as receiver differential data signals. More specifically, a positive side receiver differential signal Rx0+ is assigned to the terminal P102, and a negative side receiver differential signal Rx0− is assigned to the terminal P103. Receiver differential signals Rx1 output from the host device are assigned to the terminals P105 and P106. More specifically, a positive side receiver differential signal Rx1+ is assigned to the terminal P105, and a negative side receiver differential signal Rx1− is assigned to the terminal P106.

As described above, the terminals P102, P103, P105, and P106 which are terminals used as signal terminals for transmitting differential signal pairs compliant with the PCIe standard, and are arranged between a center line of the memory device 10 and a main body 11 in the X-axis direction and a second edge 32 are assigned differential signal pairs on a receiving side.

Transmitter differential signals Tx0 output from the memory device 10 are assigned to the terminals P108 and P109. Transmitter differential signals may be referred to as transmitter differential data signals. More specifically, a positive side transmitter differential signal Tx0+ is assigned to the terminal P108, and a negative side transmitter differential signal Tx0− is assigned to the terminal P109. Transmitter differential signals Tx1 output from the memory device are assigned to the terminals P111 and P112. More specifically, a positive side transmitter differential signal Tx1+ is assigned to the terminal P111, and a negative side transmitter differential signal Tx1− is assigned to the terminal P112.

As described above, the terminals P108, P109, P111, and P112 which are terminals used as signal terminals for transmitting differential signal pairs compliant with the PCIe standard, and are arranged between a center line of the memory device 10 and the main body 11 in the X-axis direction and a third edge 33 are assigned differential signal pairs on a transmitting side.

In the PCIe standard, one lane is configured by a receive side differential signal pair and a transmit side differential signal pair. In FIG. 17, one lane is configured by the receiver differential signal pair Rx0+ and Rx0− and the transmitter differential signal pair Tx0+ and Tx0−. Another lane is configured by the receiver differential signal pair Rx1+ and Rx1− and the transmitter differential signal pair Tx1+ and Tx1−. This makes it possible to transmitter differential signal pairs for two lanes in compliance with the PCIe standard, as described above.

As shown in FIG. 17, the terminals P102 and P103 to which the receiver differential signal pair Rx0+ and Rx0− is assigned are located between the terminals P101 and P104 which are used as ground terminals. Also, as shown in FIG. 17, the terminals P105 and P106 to which the receiver differential signal pair Rx1+ and Rx1− is assigned are located between the terminals P104 and P107 which are used as ground terminals. Furthermore, as shown in FIG. 17, the terminals P108 and P109 to which the transmitter differential signal pair Tx0+ and Tx0− is assigned are located between the terminals P107 and P110 which are used as ground terminals. Also, as shown in FIG. 17, the terminals P111 and P112 to which the transmitter differential signal pair Tx1+ and Tx1− is assigned are located between the terminals P110 and P113 which are used as ground terminals.

According to the pin assignment shown in FIG. 17, it is possible to reduce the effect of crosstalk. Crosstalk is a phenomenon in which, due to affecting an adjacent signal line or being affected by an adjacent signal line, the signal quality in these signal lines becomes degraded. In the present embodiment, consideration is given to the effect that a transmission differential signal pair with strong signal strength affects a reception differential signal pair with weak signal strength and degrades the signal quality of the reception differential signal pair.

Figure 18:
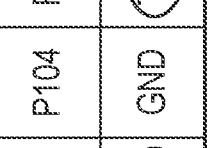
FIG. 18 shows a pin assignment of a comparative example with respect to a configuration of FIG. 17.

In the following, a pin assignment shown in FIG. 18 is used as a comparative example to explain the effects of the pin assignment according to the present embodiment in more detail. Note that the comparative example is intended to illustrate some of the effects that can be achieved by the pin assignment according to the present embodiment, and does not exclude the effects common to the comparative example and the present embodiment.

FIG. 18 shows an example of the pin assignment according to the comparative example. As shown in FIG. 18, the pin assignment according to the comparative example differs from the pin assignment according to the present embodiment in that the transmitter differential signal pair Tx0+ and Tx0− is assigned to the terminals P105 and P106, and the receiver differential signal pair Rx1+ and Rx1− is assigned to the terminals P108 and P109.

According to the pin assignment shown in FIG. 18, sometimes the receiver differential signal pair Rx0+ and Rx0− assigned to the terminals P102 and P103 is affected by the transmitter differential signal pair Tx0+ and Tx0− assigned to the terminals P105 and P106, and the signal quality is degraded. In addition, sometimes the receiver differential signal pair Rx1+ and Rx1− assigned to the terminals P108 and P109 is affected by the transmitter differential signal pair Tx0+ and Tx0− assigned to the terminals P105 and P106 and the transmitter differential signal pair Tx1+ and Tx1− assigned to the terminals P111 and P112, and the signal quality is degraded.

In contrast, according to the pin assignment according to the present embodiment, as shown in FIG. 17, since there is no terminal to which the transmitter differential signal pair is assigned near the terminals P102 and P103 to which the receiver differential signal pair Rx0+ and Rx0− is assigned, the receiver differential signal pair Rx0+ and Rx0− is hardly affected by crosstalk, and signal quality degradation can be suppressed. Furthermore, as shown in FIG. 17, although there are the terminals P108 and P109 to which the transmitter differential signal pair Tx0+ and Tx0− is assigned as the terminals to which the transmitter differential signal pair is assigned near the terminals P105 and P106 to which the receiver differential signal pair Rx1+ and Rx1− is assigned, since the receiver differential signal pair Rx1+ and Rx1− is not affected by both the transmitter differential signal pair Tx0+ and Tx0− and the transmitter differential signal pair Tx1+ and Tx1− as in the comparison example, the signal quality degradation can be suppressed more than in the comparative example.

Note that, in FIG. 17, although the pin assignment in which the receiver differential signal pair Rx0+ and Rx0− is assigned to the terminals P102 and P103, the receiver differential signal pair Rx1+ and Rx1− is assigned to the terminals P105 and P106, the transmitter differential signal pair Tx0+ and Tx0− is assigned to the terminals P108 and P109, and the transmitter differential signal pair Tx1+ and Tx1− is assigned to the terminals P111 and P112 is described, pin assignments that can suppress signal quality degradation caused by crosstalk are not limited thereto. For example, the transmitter differential signal pair Tx1+ and Tx1− may be assigned to the terminals P102 and P103, the transmitter differential signal pair Tx0+ and Tx0− may be assigned to the terminals P105 and P106, the receiver differential signal pair Rx1+ and Rx1− may be assigned to the terminals P108 and P109, and the receiver differential signal pair Rx0+ and Rx0− may be assigned to the terminals P111 and P112. Even in this case, as in FIG. 17, the signal quality degradation caused by crosstalk can be suppressed.

In other words, if the pin assignment is such that a differential signal pair on the receiving side is assigned to one of the left and right terminals, and a differential signal pair on the transmitting side is assigned to the other one of the left and right terminals, it is possible to suppress signal quality degradation caused by crosstalk in a similar manner as in the case of FIG. 17.

Furthermore, in FIG. 17, a case in which the number of terminals belonging to row R1 is 13 is explained; however, the number of terminals belonging to row R1 is not limited thereto. Therefore, more terminals than 13 may be arranged in row R1. In the case where the number of terminals belonging to row R1 is 14 or more, as shown in FIG. 19, by arranging two or more ground terminals P107 and P108 between the terminals P105 and P106 to which the receiver differential signal pair Rx1+ and Rx1− is assigned and the terminals P109 and P110 to which the transmitter differential signal pair Tx0+ and Tx0− is assigned (in other words, terminals with the closest distance between the terminals to which the receiver differential signal pair is assigned and the terminals to which the transmitter differential signal pair is assigned), it is possible to reduce the effect of the transmitter differential signal pair Tx0+ and Tx0− on the receiver differential signal pair Rx1+ and Rx1−, thereby suppressing signal quality degradation.

FIG. 20 shows an example of a pin assignment of a group of terminals P114 to P119 belonging to row R2 and a group of terminals P120 to P132 belonging to row R3 of the memory device 10. The group of terminals P114 to P119 belonging to row R2 is used as signal terminals for arbitrary optional signals that vary from product to product. The group of terminals P120 to P132 belonging to row R3 is used as signal terminals and power supply terminals for control signals common to all products.

As shown in FIG. 20, the terminals P114, P115, P118, and P119 belonging to row R2 are used as ground terminals (GND terminals) for a return current. According to another expression, in the group of terminals P114 to P119 belonging to row R2, a plurality of terminals P114 and P115 arranged between a center line of the memory device 10 and the main body 11 in the X-axis direction and the second edge 32 are used as ground terminals for return current, and a plurality of terminals P118 and P119 arranged between the center line of the memory device 10 and the main body 11 in the X-axis direction and a third edge 33 are used as ground terminals for return current.

The terminals P116 and P117 belonging to row R2 are used as reserve terminals (RSVD terminals) and are assigned, for example, sideband signals.

Furthermore, as shown in FIG. 20, for example, PCIe standard signals are assigned to the terminals P121, P122, P125, and P129 belonging to row R3. More specifically, a differential signal pair REFCLK+ and REFCLK− is assigned to the terminals P121 and P122. A PERST #signal (reset signal) is assigned to the terminal P125. A CLKREQ #signal is assigned to the terminal P129.

Furthermore, as shown in FIG. 20, the terminals P120 and P123 belonging to row R3 are used as ground terminals for noise guard. The terminals P121 and P122 to which the differential signal pair REFCLK+ and REFCLK− is assigned are located between the terminals P120 and P123 which are used as the ground terminals for noise guard.

Furthermore, as shown in FIG. 20, the terminal P124 belonging to row R3 is used as the ground terminal for return current. The terminals P126 to P128 belonging to row R3 are used as power supply terminals for supplying a second power supply voltage (e.g., 1.2 V). The terminals P130 to P132 belonging to row R3 are used as power supply terminals for supplying a first power supply voltage (e.g., 2.5 V).

According to the pin assignment shown in FIG. 20, it is possible to cope with an increase in the amount of current that accompanies the performance improvement of the memory device 10. For example, in a case of comparing a PCIe 3.0 compliant device with a PCIe 4.0 compliant device, while the PCIe 4.0 compliant device exercises approximately twice as much performance as the PCIe 3.0 compliant device, it increases current consumption. According to the pin assignment according to the present embodiment, it is possible to cope with such an increase in current consumption.

In the following, a pin assignment shown in FIG. 21 is used as a comparative example to explain the effects of the pin assignment according to the present embodiment in more detail. Note that the comparative example is intended to illustrate some of the effects that can be achieved by the pin assignment according to the present embodiment, and does not exclude the effects common to the comparative example and the present embodiment.

FIG. 21 shows an example of the pin assignment according to the comparative example. As shown in FIG. 21, the pin assignment according to the comparative example differs from the pin assignment according to the present embodiment in that the terminals P115 and P118 of row R2 are used as reserve terminals instead of the ground terminals for return current. In addition, the pin assignment according to the comparative example differs from the pin assignment according to the present example in that the terminal P132 in row R3 is used as an NC terminal, and the ground terminal for return current is not arranged in row R3. Furthermore, the pin assignment according to the comparative example differs from the pin assignment according to the present embodiment in that, in row R3, the terminal P124 adjacent to the terminal P123, which is used as the ground terminal for noise guard, is used as a power supply terminal.

According to the pin assignment shown in FIG. 21, in a case where the current consumption increases due to the improved performance of the memory device 10, since there is no ground terminal for return current other than the terminals P114 and P119, it is necessary to flow the increased return current through the terminals P120 and P123 which are used as the ground terminal for noise guard to cope with the increased current consumption. When the return current flows through the terminals P120 and P123 used as the ground terminals for noise guard, sometimes signal qualities of the differential signal pair REFCLK+ and REFCLK-assigned to the terminals P121 and P122 located between these terminals are degraded.

In contrast, according to the pin assignment according to the present embodiment, as shown in FIG. 20, since the terminals P115 and P118 belonging to row R2, and the terminal P124 belonging to row R3 are used as ground terminals for return current, the increased return current can flow through these terminals P115, 118, and 124, and it is possible to cope with the increase in the current consumption accompanying improved performance of the memory device 10. In addition, according to the pin assignment of the present embodiment, as described above, a path can be secured for the increased amount of return current. Therefore, it is possible to suppress the signal quality degradation of the differential signal pair REFCLK+ and REFCLK−. Furthermore, according to the pin assignment of the present embodiment, since the ground terminal and the power supply terminal are not located adjacent to each other as in the comparative example, it is possible to suppress a lead frame corresponding to the ground terminal of the connector 100 from accidentally contacting the power supply terminal, for example, due to vibration.

Figure 22:
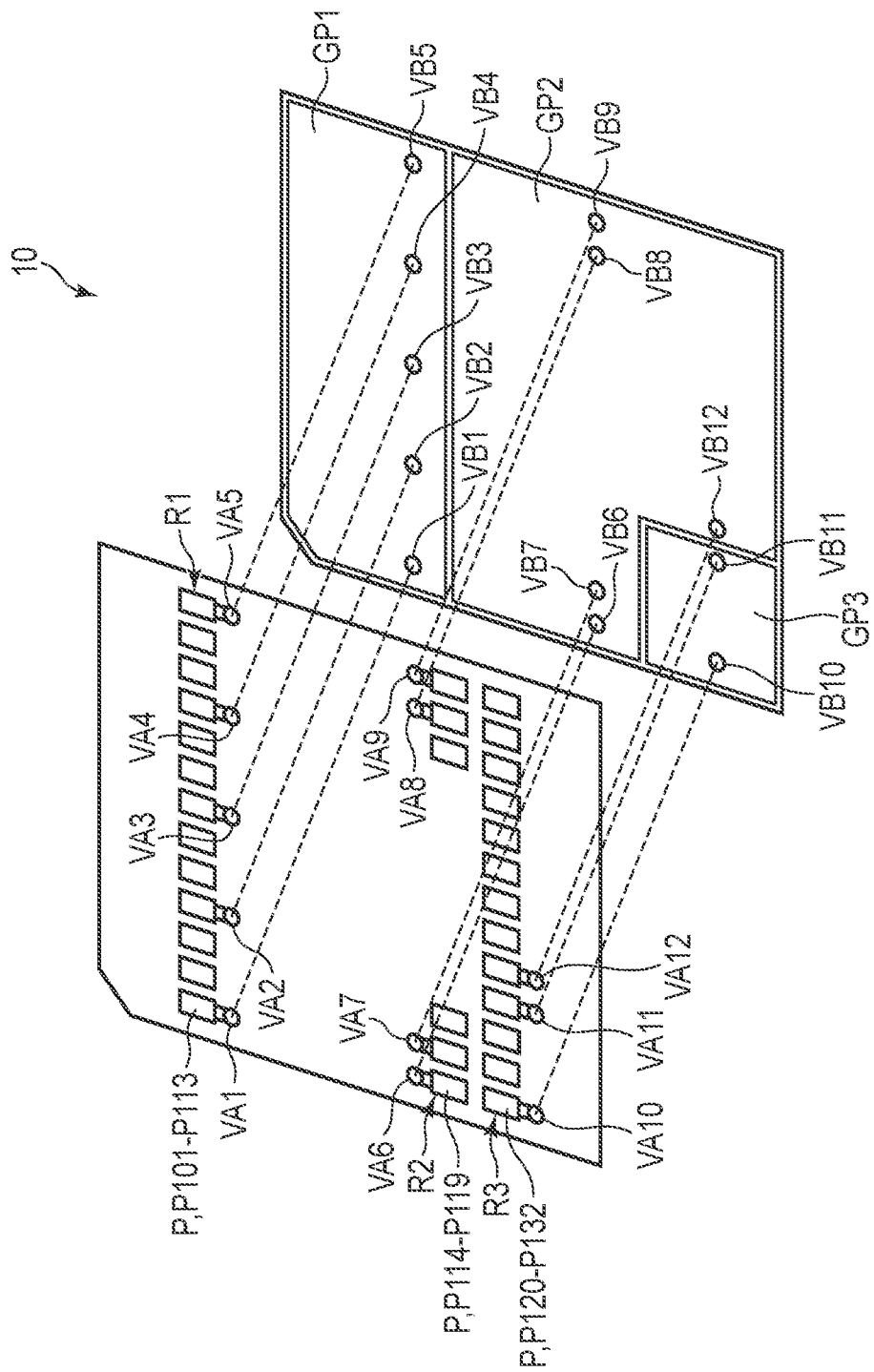
FIG. 22 is a perspective view showing an outer layer and an inner layer of the memory device according to the same embodiment.

FIG. 22 is a perspective view showing an outer layer and an inner layer of the memory device 10. As shown in FIG. 22, the outer layer of the memory device 10 is provided with a group of terminals P101 to P113 belonging to row R1, a group of terminals P114 to P119 belonging to row R2, a group of terminals P120 to P132 belonging to row R3, and vias VA1 to VA12 for connecting the terminals P101, P104, P107, P110, P113, P114, P115, P118, P119, P120, P123, and P124 used as ground terminals and the inner layer.

As shown in FIG. 22, the inner layer of the memory device 10 is provided with a ground plane GP1 that is electrically and thermally connected to the terminals P101, P104, P107, P110, and P113 used as ground terminals for noise guard in row R1. The inner layer of the memory device 10 is provided with a ground plane GP2 that is electrically and thermally connected to the terminals P114, P115, P118, and P119 used as ground terminals for noise guard in row R2 and the terminal P124 used as a ground terminal for return current in row R3. The inner layer of the memory device 10 is provided with a ground plane GP3 that is electrically and thermally connected to the terminals P120 and P123 used as ground terminals for noise guard in row R3. The ground planes GP1 to GP3 are formed, for example, of copper foil. The ground planes GP1 to GP3 are not electrically connected to each other. In addition, the inner layer of the memory device 10 is provided with vias VB1 to VB12 corresponding to the vias VA1 to VA12 provided on the outer layer.

The terminals P101, P104, P107, P110, and P113 provided on the outer layer of the memory device 10 and used as the ground terminals are electrically and thermally connected to the ground plane GP1 through the vias VA1 to VA5 and the vias VB1 to VB5. The terminals P114, P115, P118, P119, and P124 provided on the outer layer of the memory device 10 and used as ground terminals for return current are electrically and thermally connected to the ground plane GP2 through the vias VA6 to VA9 and VA12 and the vias VB6 to VB9 and VB12. The terminals P120 and P123 provided on the outer layer of the memory device 10 and used as ground terminals for noise guard are electrically and thermally connected to the ground plane GP3 through the vias VA10 and VA11 and the vias VB10 and VB11.

Note that, in FIG. 22, a case in which the ground planes GP1 to GP3 are formed in the same layer is exemplified. However, it is not limited thereto, and each of the ground planes GP1 to GP3 may be formed on a different layer.

According to the configuration shown in FIG. 22 (in other words, the pin assignments shown in FIG. 20), the heat dissipation effect can be improved compared to the configuration in the comparative example shown in FIG. 21. More specifically, since the configuration shown in FIG. 22 has a larger number of terminals used as the ground terminals than in the configuration of the comparative example shown in FIG. 21, and more terminals can be electrically and thermally connected to the ground plane GP2, it is possible to improve the heat dissipation effect more than in the configuration of the comparative example.

According to the second embodiment described above, the memory device 10 includes a plurality of pairs of a pair of terminals to which a receiver differential signal pair is assigned (e.g., terminals P102 and P103 and P105 and P106) and a pair of terminals to which a transmitter differential signal pair is assigned (e.g., terminals P108 and P109 and P111 and P112), in which a plurality of pairs of the pair of terminals to which the receiver differential signal pair is assigned are located between a center line of the main body 11 in the X-axis direction and one of the side edges (second edge 32), and a plurality of pairs of the pair of terminals to which the transmitter differential signal pair is assigned are located between the center line of the main body 11 in the X-axis direction and the other side edge (third edge 33). According to this, it is possible to suppress crosstalk and signal quality degradation.

According to the second embodiment described above, the memory device 10 includes a plurality of ground terminals for return current (e.g., terminals P114 and P115) arranged between the center line of the main body 11 in the X-axis direction and the second edge 32, and includes a plurality of ground terminals for return current (e.g., terminals P118 and P119) arranged between the center line of the main body 11 in the X-axis direction and the third edge 33. Since this allows a plurality of terminals belonging to row R2 to be electrically and thermally connected to the ground plane GP2, it is possible to improve heat dissipation.

Third Embodiment

Next, a third embodiment will be described. Note that the detailed description of the matters already described in the first and second embodiments above will be omitted, and the following will mainly describe the matters that differ from the first and second embodiments above.

Figure 23:
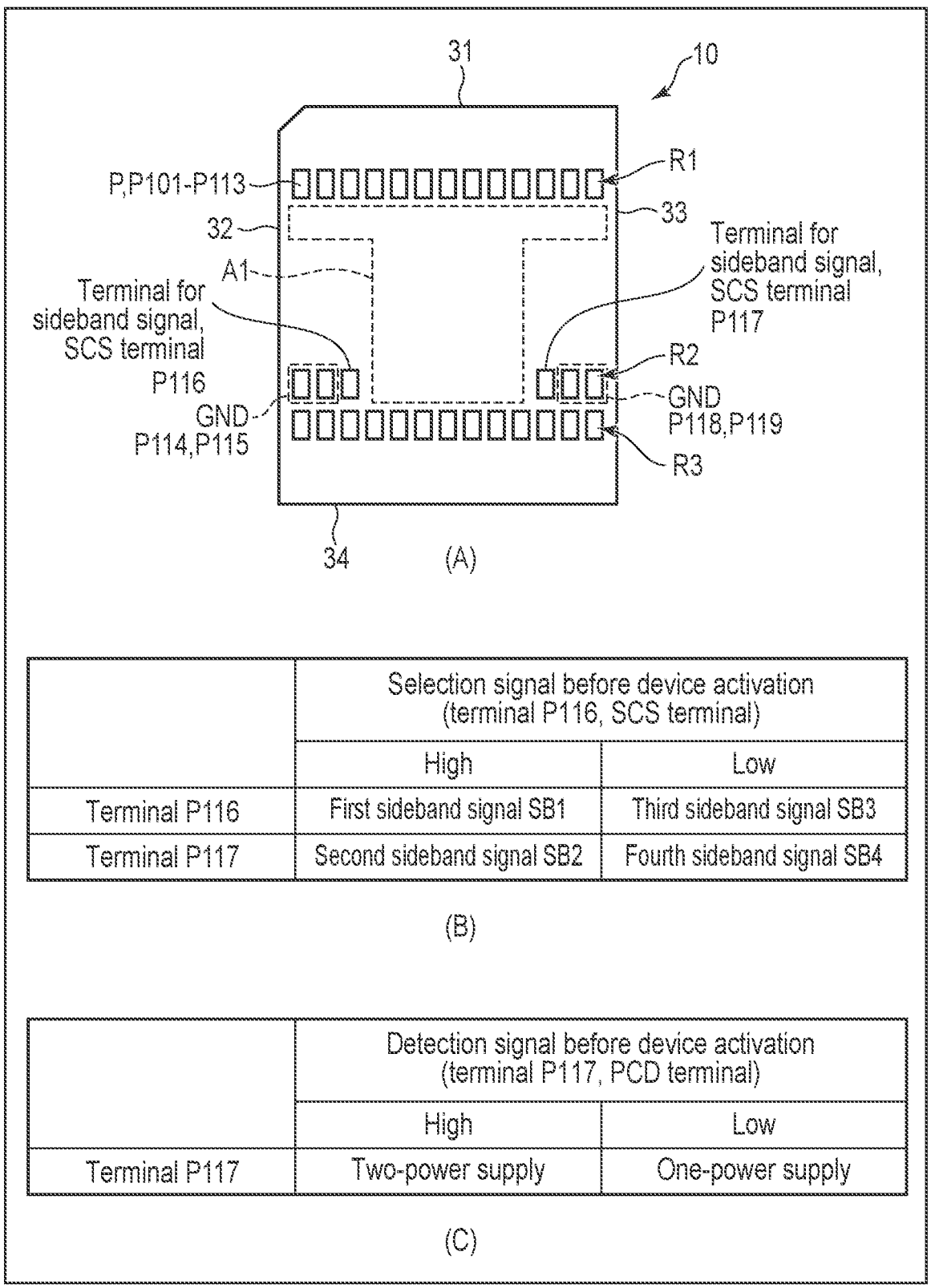
FIG. 23 relates to terminals of a memory device according to a third embodiment, and illustrates a case in which a signal terminal for transmitting a sideband signal and an SCS terminal and a PCD terminal are shared.

FIG. 23 illustrates a case in which terminals P116 and P117 belonging to row R2 of a memory device 10 are used as signal terminals for transmitting a sideband signal, and the terminals P116 and P117 are also used as an SCS terminal and a PCD terminal (i.e., in a case where signal terminals for transmitting sideband signals and the SCS terminal and the PCD terminal are shared).

As described above, the SCS terminal is a signal terminal used for inputting selection signals before startup of the memory device 10, and the PCD terminal is a signal terminal used for outputting detection signals before startup of the memory device 10. In contrast, since a sideband signal is a signal input after startup of the memory device 10, the signal terminal for transmitting the sideband signal can be shared with the SCS terminal and the PCD terminal. Note that before startup of the memory device 10 corresponds to a case in which a reset signal is active, and after startup of the memory device 10 corresponds to a case in which the reset signal is released.

(A) of FIG. 23 assumes a case in which the terminal P116 belonging to row R2 of the memory device 10 is shared by the signal terminal for transmitting sideband signals and the SCS terminal. More specifically, a case in which the terminal P116 is used as the SCS terminal before startup of the memory device 10, and is used as the signal terminal for transmitting sideband signals after startup of the memory device 10 is assumed. Furthermore, (A) of FIG. 23 assumes a case in which the terminal P117 belonging to row R2 of the memory device 10 is shared by the signal terminal for transmitting sideband signals and the PCD terminal. More specifically, a case in which the terminal P117 is used as the PCD terminal before startup of the memory device 10, and is used as the signal terminal for transmitting sideband signals after startup of the memory device 10 is assumed.

As shown in (B) of FIG. 23, in a case where a high level selection signal is input to the terminal P116 used as the SCS terminal before startup of the device, the terminal P116 is used as a signal terminal for transmitting a first sideband signal SB1 after startup of the device, and the terminal P117 is used as a signal terminal for transmitting a second sideband signal SB2. According to another expression, in a case where a high level selection signal is input to the terminal P116 used as the SCS terminal before startup of the device, after startup of the device, the terminals P116 and P117 are used as the signal terminals for transmitting the sideband signals SB1 and SB2 of a first configuration.

On the other hand, as shown in (B) of FIG. 23, in a case where a low level selection signal is input to the terminal P116 used as the SCS terminal before startup of the device, after startup of the device, the terminal P116 is used as the signal terminal for transmitting a third sideband signal SB3, and the terminal P117 is used as the signal terminal for transmitting a fourth sideband signal SB4. According to another expression, in a case where the low level selection signal is input to the terminal P116 used as the SCS terminal before startup of the device, after startup of the device, the terminals P116 and P117 are used as the signal terminals for transmitting the sideband signals SB3 and SB4 of a second configuration.

As shown in (C) of FIG. 23, in a case where a high level detection signal is output from the terminal P117 used as the PCD terminal before startup of the device, a host device recognizes that a power supply configuration of the memory device 10 is a two-power supply. On the other hand, as shown in (C) of FIG. 23, in a case where a low level detection signal is output from the terminal P117 used as the PCD terminal before startup of the device, the host device recognizes that the power supply configuration of the memory device 10 is a one-power supply.

Figure 24:
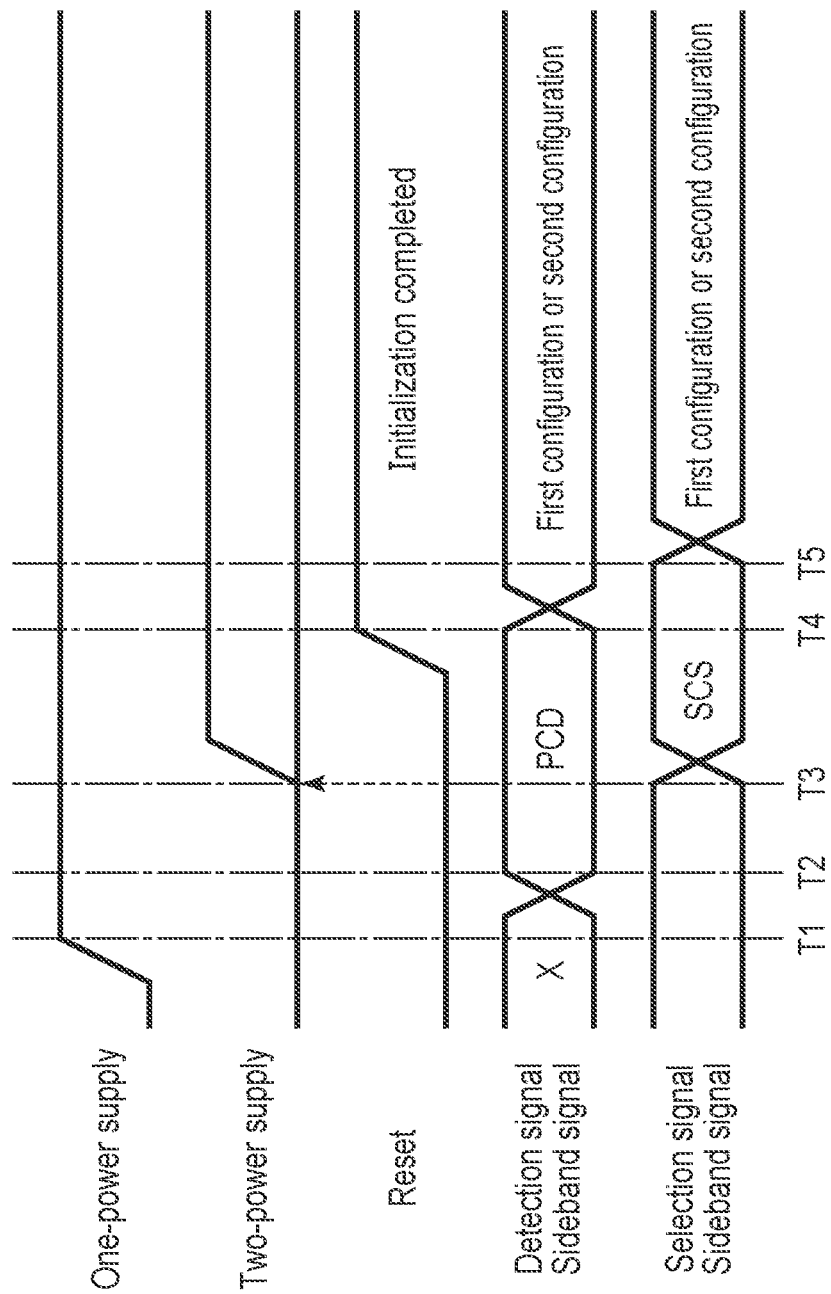
FIG. 24 relates to the terminals of the memory device according to the same embodiment, and shows a timing chart of an operation example in a case where the signal terminal for transmitting a sideband signal and the SCS terminal and the PCD terminal are shared.

Here, with reference to a timing chart in FIG. 24, an operation example of the memory device 10 with the configuration shown in FIG. 23, and an operation example in a case where the signal terminal for transmitting sideband signals and the SCS terminal and the PCD terminal are shared are described.

As shown in FIG. 24, at a first timing T1, under a control of the host device (host controller 201), a first power supply voltage starts being supplied to the memory device 10. When the first power supply voltage starts being supplied to the memory device 10, at a second timing T2, a detection signal is output from the PCD terminal of the memory device 10 (i.e., the terminal P117 before startup of the device) to the host device. At a third timing T3, the host device reads the detection signal output from the memory device 10, recognizes the power supply configuration of the memory device 10, and determines whether or not to supply a second power supply voltage. Furthermore, at the third timing T3, the host device asserts the terminal P116 used as the SCS terminal, then, outputs the selection signal to the memory device 10.

At a fourth timing T4 after the power supply configuration of the memory device 10 is recognized, a low active reset signal is deasserted. According to this, during the subsequent period, the terminal P117 used as the PCD terminal is used as the signal terminal for transmitting the sideband signal configured according to the level of the selection signal input to the SCS terminal. Then, at a fifth timing T5, the host device deasserts the terminal P116 used as the SCS terminal, and, during the subsequent period, the terminal P116 is used as the signal terminal for transmitting the sideband signal configured according to the level of the selection signal input to the SCS terminal.

According to the configurations shown in FIG. 23 and FIG. 24, since the signal terminal for transmitting sideband signals and the SCS terminal and the PCD terminal can be shared, it is possible to improve the degree of freedom in designing the pin assignment of the memory device 10. For example, as shown in FIG. 20 and FIG. 22, it is possible to increase the number of terminals used as the ground terminal for return current.

According to the third embodiment described above, the memory device 10 includes at least two signal terminals to which sideband signals are assigned (e.g., terminals P116 and P117), and before startup of the memory device 10, a selection signal is input to one signal terminal (e.g., terminal P116), and, after startup of the memory device 10, a detection signal is output from the other signal terminal (e.g., terminal P117). According to this, it is possible to share the signal terminal for transmitting sideband signals, the SCS terminal, and the PCD terminal, and the degree of freedom for designing the pin assignment of the memory device 10 can be improved.

According to at least one embodiment described above, it is possible to provide a memory device 10 that can improve heat dissipation efficiency.

In the present embodiment, a NAND flash memory is exemplified as a nonvolatile memory. However, the functions of the present embodiment are also applicable to various other nonvolatile memories such as, a magnetoresistive random access memory (MRAM), a phase change random access memory (PRAM), and a resistive random access memory (ReRAM), or a ferroelectric random access memory (FeRAM).

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A semiconductor storage device comprising:
a main body including a first surface, a second surface located on an opposite side of the first surface, a first end edge extending in a first direction, a second end edge located on an opposite side of the first end edge and extending in the first direction, a first side edge extending in a second direction intersecting the first direction, and a second side edge located on an opposite side of the first side edge and extending in the second direction;
a memory provided inside the main body;
a controller provided inside the main body to control the memory; and
a plurality of terminals including a plurality of signal terminals used for transmitting signals and exposed on the first surface, wherein
the plurality of terminals form at least a first row and a second row,
the first row includes a plurality of terminals arranged in the first direction at intervals from each other at a location closer to the first end edge than to the second end edge,
the second row includes a plurality of terminals arranged in the first direction at intervals from each other at a location closer to the second end edge than to the first end edge,
an area between the first row and the second row of the first surface includes a contact area in contact with a thermal conductive member, which is arranged on a printed circuit board in a host device electrically connectable to the semiconductor storage device,
the plurality of terminals further form a third row,
the third row includes a plurality of terminals arranged in the first direction at intervals from each other at a location between the first row and the second row, and the number of terminals forming the third row is less than the number of terminals forming the first row or the second row, and the third row is located closer to the second end edge than to the first end edge and farther from the second end edge than from the second row.

2. The semiconductor storage device of claim 1, wherein a distance between the first row and the second row in the second direction is longer than a distance between the first row and the first end edge in the second direction, and is longer than a distance between the second row and the second end edge in the second direction.

3. The semiconductor storage device of claim 1, wherein the plurality of terminals forming the first row includes at least a pair of differential data signal terminals to which a differential data signal is assigned, and the plurality of terminals forming the second row includes a power supply terminal assigned to supply a power supply voltage from the host device.

4. The semiconductor storage device of claim 3, wherein the differential data signal is compliant with a PCIe standard, and the plurality of terminals forming the first row include a plurality of pairs of the differential data signal terminals assigned to a plurality of lanes of the differential data signal.

5. The semiconductor storage device of claim 1, wherein the contact area includes an area vacated by the number of terminals forming the third row being reduced from the number of terminals forming the first row.

6. The semiconductor storage device of claim 5, wherein the plurality of terminals forming the third row include at least one ground terminal assigned to a ground and at least one sideband signal terminal assigned to a PCIe standard sideband signal.

7. The semiconductor storage device of claim 1, wherein the third row includes an equal number of terminals between a center line of the main body in the first direction and the first side edge and between the center line and the second side edge.

8. The semiconductor storage device of claim 7, wherein the third row includes the plurality of terminals in between the center line and the first side edge and between the center line and the second side edge.

9. The semiconductor storage device of claim 1, wherein the third row includes a different number of terminals between a center line of the main body in the first direction and the first side edge and between the center line and the second side edge.

10. The semiconductor storage device of claim 1, wherein the plurality of terminals forming the first row include a plurality of pairs of a pair of receiver differential data signal terminals to which a receiver differential data signal is assigned and a pair of transmitter differential data signal terminals to which a transmitter differential data signal is assigned, and a plurality of pairs of the pair of receiver differential data signal terminals are located between a center line of the main body in the first direction and one side edge, and a plurality of pairs of the pair of transmitter differential data signal terminals are located between the center line and the other side edge.

11. The semiconductor storage device of claim 10, wherein the pair of receiver differential data signal terminals and the pair of transmitter differential data signal terminals are located between ground terminals for noise guard.

12. A semiconductor storage device comprising:
a main body including a first surface, a second surface located on an opposite side of the first surface, a first end edge extending in a first direction, a second end edge located on an opposite side of the first end edge and extending in the first direction, a first side edge extending in a second direction intersecting the first direction, and a second side edge located on an opposite side of the first side edge and extending in the second direction;
a memory provided inside the main body;
a controller provided inside the main body to control the memory; and
a plurality of terminals including a plurality of signal terminals used for transmitting signals and exposed on the first surface, wherein
the plurality of terminals form at least a first row and a second row,
the first row includes a plurality of terminals arranged in the first direction at intervals from each other at a location closer to the first end edge than to the second end edge,
the second row includes a plurality of terminals arranged in the first direction at intervals from each other at a location closer to the second end edge than to the first end edge,
an area between the first row and the second row of the first surface includes a contact area in contact with a thermal conductive member, which is arranged on a printed circuit board in a host device electrically connectable to the semiconductor storage device,
the plurality of terminals further form a third row,
the third row includes a plurality of terminals arranged in the first direction at intervals from each other at a location between the first row and the second row, and the number of terminals forming the third row is less than the number of terminals forming the first row or the second row, and
the third row is located closer to the first end edge than to the second end edge and farther from the first end edge than from the first row.

13. A semiconductor storage device comprising:
a main body including a first surface, a second surface located on an opposite side of the first surface, a first end edge extending in a first direction, a second end edge located on an opposite side of the first end edge and extending in the first direction, a first side edge extending in a second direction intersecting the first direction, and a second side edge located on an opposite side of the first side edge and extending in the second direction;
a memory provided inside the main body;
a controller provided inside the main body to control the memory; and
a plurality of terminals including a plurality of signal terminals used for transmitting signals and exposed on the first surface, wherein
the plurality of terminals form at least a first row and a second row,
the first row includes a plurality of terminals arranged in the first direction at intervals from each other at a location closer to the first end edge than to the second end edge,
the second row includes a plurality of terminals arranged in the first direction at intervals from each other at a location closer to the second end edge than to the first end edge, an area between the first row and the second row of the first surface includes a contact area in contact with a thermal conductive member, which is arranged on a printed circuit board in a host device electrically connectable to the semiconductor storage device, the plurality of terminals further form a third row, the third row includes a plurality of terminals arranged in the first direction at intervals from each other at a location between the first row and the second row, and the number of terminals forming the third row is less than the number of terminals forming the first row or the second row, the contact area includes an area vacated by the number of terminals forming the third row being reduced from the number of terminals forming the first row, the plurality of terminals forming the third row include at least one ground terminal assigned to a ground and at least one sideband signal terminal assigned to a PCIe standard sideband signal, the plurality of terminals forming the second row include a first terminal to which a selection signal is assigned to select a configuration of the sideband signal, and in a case where the selection signal of a high level is input to the first terminal, the at least one sideband signal terminal is assigned to a first sideband signal, and in a case where the selection signal of a low level is input to the first terminal, the at least one sideband signal terminal is assigned to a second sideband signal that is different from the first sideband signal.

14. A semiconductor storage device comprising:

a main body including a first surface, a second surface located on an opposite side of the first surface, a first end edge extending in a first direction, a second end edge located on an opposite side of the first end edge and extending in the first direction, a first side edge extending in a second direction intersecting the first direction, and a second side edge located on an opposite side of the first side edge and extending in the second direction;

a memory provided inside the main body;

a controller provided inside the main body to control the memory; and a plurality of terminals including a plurality of signal terminals used for transmitting signals and exposed on the first surface, wherein the plurality of terminals form at least a first row and a second row, the first row includes a plurality of terminals arranged in the first direction at intervals from each other at a location closer to the first end edge than to the second end edge, the second row includes a plurality of terminals arranged in the first direction at intervals from each other at a location closer to the second end edge than to the first end edge, an area between the first row and the second row of the first surface includes a contact area in contact with a thermal conductive member, which is arranged on a printed circuit board in a host device electrically connectable to the semiconductor storage device, the plurality of terminals further form a third row, the third row includes a plurality of terminals arranged in the first direction at intervals from each other at a location between the first row and the second row, and the number of terminals forming the third row is less than the number of terminals forming the first row or the second row, the contact area includes an area vacated by the number of terminals forming the third row being reduced from the number of terminals forming the first row, the plurality of terminals forming the third row include at least one ground terminal assigned to a ground and at least one sideband signal terminal assigned to a PCIe standard sideband signal, the plurality of terminals forming the second row include a second terminal to which a detection signal is assigned for the host device to detect a power supply configuration of the semiconductor storage device, and in a case where the power supply configuration of the semiconductor storage device is configured to operate at a plurality types of power supply voltages, the controller outputs the detection signal of a high level to the host device via the second terminal, and in a case where the power supply configuration of the semiconductor storage device is configured to operate at one type of power supply voltage, the controller outputs the detection signal of a low level to the host device via the second terminal.

15. A semiconductor storage device comprising:

a main body including a first surface, a second surface located on an opposite side of the first surface, a first end edge extending in a first direction, a second end edge located on an opposite side of the first end edge and extending in the first direction, a first side edge extending in a second direction intersecting the first direction, and a second side edge located on an opposite side of the first side edge and extending in the second direction;

a memory provided inside the main body;

a controller provided inside the main body to control the memory; and a plurality of terminals including a plurality of signal terminals used for transmitting signals and exposed on the first surface, wherein the plurality of terminals form at least a first row and a second row, the first row includes a plurality of terminals arranged in the first direction at intervals from each other at a location closer to the first end edge than to the second end edge, the second row includes a plurality of terminals arranged in the first direction at intervals from each other at a location closer to the second end edge than to the first end edge, an area between the first row and the second row of the first surface includes a contact area in contact with a thermal conductive member, which is arranged on a printed circuit board in a host device electrically connectable to the semiconductor storage device, the plurality of terminals forming the first row include a plurality of pairs of a pair of receiver differential data signal terminals to which a receiver differential data signal is assigned and a pair of transmitter differential data signal terminals to which a transmitter differential data signal is assigned, a plurality of pairs of the pair of receiver differential data signal terminals are located between a center line of the main body in the first direction and one side edge, and a plurality of pairs of the pair of transmitter differential data signal terminals are located between the center line and the other side edge, the plurality of terminals further form a third row, the third row includes a plurality of terminals arranged in the first direction at intervals from each other at a location between the first row and the second row, and the plurality of terminals forming the third row include a plurality of ground terminals for return current arranged between the center line and the first side edge, and include the plurality of ground terminals for return current arranged between the center line and the second side edge.

16. The semiconductor storage device of claim 15, wherein the plurality of terminals forming the second row include at least one ground terminal for return current.

17. The semiconductor storage device of claim 16 further comprising a first ground plane connected to a ground terminal for noise guard and a second ground plane connected to the ground terminal for return current inside the main body, wherein the first ground plane and the second ground plane are not electrically connected.

18. The semiconductor storage device of claim 15, wherein the plurality of terminals forming the third row include at least two first signal terminals to which a sideband signal is assigned, before startup of the semiconductor storage device, a selection signal for selecting a configuration of the sideband signal is input to one of the first signal terminals, and a detection signal is output from the other first signal terminal for the host device to detect a power supply configuration of the semiconductor storage device, and after startup of the semiconductor storage device, the sideband signal is input to the two signal terminals.

19. The semiconductor storage device of claim 18, wherein the plurality of terminals forming the second row include a second signal terminal to which a reset signal is assigned, in a case where the reset signal is active, the selection signal is input to one of the first signal terminals, and the detection signal is output from the other first signal terminal, and in a case where the reset signal is released, the sideband signal is input to the two first signal terminals.

* * * * *